(12) United States Patent
Fox et al.

(10) Patent No.: US 8,453,348 B2
(45) Date of Patent: *Jun. 4, 2013

(54) METHODS OF MAKING POLYMERIC ARTICLES AND POLYMERIC ARTICLES FORMED THEREBY

(75) Inventors: Richard B. Fox, Smithfield, RI (US); Daniel M. Wyner, North Scituate, RI (US)

(73) Assignee: Polyworks, Inc., North Smithfield, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,048

(22) Filed: Nov. 3, 2010

(65) Prior Publication Data

US 2011/0041358 A1  Feb. 24, 2011

Related U.S. Application Data

(63) Continuation of application No. 11/712,729, filed on Feb. 28, 2007, now Pat. No. 7,827,704.

(51) Int. Cl.
*A61F 5/14* (2006.01)
(52) U.S. Cl.
USPC ................................. 36/44; 36/154
(58) Field of Classification Search
USPC ......... 36/43, 44, 154, 93, 180, 88; 428/304.4, 428/158, 316.6, 178
See application file for complete search history.

(56) References Cited

U.S. PATENT DOCUMENTS

| 624,404 | A | 5/1899 | Thierry |
|---|---|---|---|
| 1,596,347 | A | 8/1926 | Gilowitz |
| 1,625,582 | A | 4/1927 | Anderson |
| 2,449,373 | A | 9/1948 | Falge et al. |
| 2,631,407 | A | 3/1953 | Rempel |
| 2,668,394 | A | 2/1954 | Auzin |
| 2,698,272 | A | 12/1954 | Clapp et al. |
| 2,956,301 | A | 10/1960 | Roop et al. |
| 2,956,313 | A | 10/1960 | Choice |
| 2,960,794 | A | 11/1960 | Johns |
| 3,287,481 | A | 11/1966 | Trojan et al. |
| 3,293,671 | A | 12/1966 | Griffin |
| 3,982,335 | A | 9/1976 | Cunningham et al. |
| 4,009,298 | A | 2/1977 | Cavanagh |
| 4,168,754 | A | 9/1979 | Nyholm |
| 4,234,640 | A | 11/1980 | Wittel |
| 4,240,224 | A | 12/1980 | Katzman et al. |
| 4,242,398 | A | 12/1980 | Segawa et al. |

(Continued)

FOREIGN PATENT DOCUMENTS

| EP | 1421878 | 5/2004 |
|---|---|---|
| JP | 05-339399 | 12/1993 |

(Continued)

OTHER PUBLICATIONS

Electronic Products, Gap filler pad improves compressability: www.electronicproducts.com.

(Continued)

*Primary Examiner* — Marie Patterson
(74) *Attorney, Agent, or Firm* — Whiteford, Taylor & Preston LLP

(57) ABSTRACT

Methods of making molded articles and the articles formed by the method, particularly viscoelastic gel articles.

37 Claims, 15 Drawing Sheets

U.S. PATENT DOCUMENTS

| | | | |
|---|---|---|---|
| 4,275,473 A | 6/1981 | Poirier | |
| 4,292,735 A | 10/1981 | Thillays | |
| 4,369,284 A | 1/1983 | Chen | |
| 4,381,579 A | 5/1983 | Rumpp | |
| 4,415,954 A | 11/1983 | Schaefer | |
| 4,416,166 A | 11/1983 | Jannard et al. | |
| 4,429,915 A | 2/1984 | Flager | |
| 4,476,742 A | 10/1984 | Midgley | |
| 4,538,787 A | 9/1985 | Fox et al. | |
| 4,552,944 A | 11/1985 | Kamiyama et al. | |
| 4,581,187 A | 4/1986 | Sullivan et al. | |
| 4,611,851 A | 9/1986 | Noyes et al. | |
| 4,666,782 A | 5/1987 | Tada et al. | |
| 4,683,671 A | 8/1987 | Farrar | |
| 4,716,662 A * | 1/1988 | Bar | 36/44 |
| 4,722,946 A | 2/1988 | Hostettler | |
| 4,794,658 A | 1/1989 | Goodale | |
| 4,805,319 A | 2/1989 | Tonkel | |
| 4,842,332 A | 6/1989 | Conner, Jr. et al. | |
| 4,853,069 A | 8/1989 | Williams et al. | |
| 4,910,886 A | 3/1990 | Sullivan et al. | |
| 4,952,439 A | 8/1990 | Hanson | |
| 4,956,932 A | 9/1990 | Cupp | |
| 4,998,367 A | 3/1991 | Leibowitz | |
| 5,098,421 A * | 3/1992 | Zook | 604/367 |
| 5,108,076 A | 4/1992 | Chiarella | |
| 5,112,543 A | 5/1992 | Thary | |
| 5,143,390 A | 9/1992 | Goldsmith | |
| 5,144,708 A | 9/1992 | Pekar | |
| 5,147,589 A | 9/1992 | Chang et al. | |
| 5,163,646 A | 11/1992 | Engelhardt | |
| 5,203,607 A | 4/1993 | Landi | |
| 5,215,699 A | 6/1993 | Lieberman | |
| 5,233,845 A | 8/1993 | D'Andrade | |
| 5,238,244 A | 8/1993 | Cotter et al. | |
| 5,267,487 A | 12/1993 | Falco et al. | |
| 5,280,993 A | 1/1994 | Hsh | |
| 5,282,326 A | 2/1994 | Schroer, Jr. et al. | |
| 5,318,344 A | 6/1994 | Wang | |
| 5,330,249 A | 7/1994 | Weber et al. | |
| 5,335,382 A | 8/1994 | Huang | |
| 5,356,099 A | 10/1994 | Sereboff | |
| 5,360,653 A | 11/1994 | Ackley | |
| 5,390,467 A | 2/1995 | Shuert | |
| 5,409,648 A | 4/1995 | Reidel | |
| 5,419,612 A | 5/1995 | Rassekhi | |
| 5,419,730 A | 5/1995 | Diresta et al. | |
| 5,420,381 A | 5/1995 | Gardner, Jr. et al. | |
| 5,435,508 A | 7/1995 | Deuitch et al. | |
| 5,445,349 A | 8/1995 | Hart | |
| 5,476,491 A | 12/1995 | Mayn | |
| 5,547,154 A | 8/1996 | Kirchhoff et al. | |
| 5,551,173 A | 9/1996 | Chambers | |
| 5,562,147 A | 10/1996 | Bortoloni | |
| 5,568,907 A | 10/1996 | Wolfe et al. | |
| 5,572,804 A | 11/1996 | Skaja et al. | |
| 5,601,264 A | 2/1997 | Peart | |
| 5,634,685 A | 6/1997 | Herring | |
| 5,701,623 A | 12/1997 | May | |
| 5,704,905 A | 1/1998 | Jensen et al. | |
| 5,709,870 A | 1/1998 | Yoshimura et al. | |
| 5,720,518 A | 2/1998 | Harrison | |
| 5,766,704 A | 6/1998 | Allen et al. | |
| 5,829,073 A | 11/1998 | Lee | |
| 5,837,314 A | 11/1998 | Beaton et al. | |
| 5,846,063 A | 12/1998 | Lakic | |
| 5,865,180 A | 2/1999 | Sigfrid | |
| 5,904,396 A | 5/1999 | Yates | |
| 5,921,840 A | 7/1999 | Diresta et al. | |
| 5,932,046 A | 8/1999 | Yates | |
| 5,938,277 A | 8/1999 | Rioux et al. | |
| 5,939,157 A | 8/1999 | Allen et al. | |
| 5,975,629 A | 11/1999 | Lorbiecki | |
| 5,980,143 A | 11/1999 | Bayer et al. | |
| 6,007,149 A | 12/1999 | Yates | |
| 6,012,772 A | 1/2000 | Conde et al. | |
| 6,012,997 A | 1/2000 | Mason | |
| 6,029,962 A | 2/2000 | Shorten et al. | |
| 6,030,035 A | 2/2000 | Yates | |
| 6,076,784 A | 6/2000 | Selker | |
| 6,093,468 A | 7/2000 | Toms et al. | |
| 6,108,869 A | 8/2000 | Meessmann et al. | |
| 6,129,799 A | 10/2000 | McGraw | |
| 6,135,550 A | 10/2000 | Tucho | |
| 6,153,277 A | 11/2000 | Chang | |
| 6,171,091 B1 | 1/2001 | Bettencourt | |
| 6,199,304 B1 | 3/2001 | Ludemann | |
| 6,305,115 B1 | 10/2001 | Cook | |
| 6,305,743 B1 | 10/2001 | Wheeler | |
| 6,311,423 B1 | 11/2001 | Graham | |
| 6,324,703 B1 | 12/2001 | Chen | |
| 6,355,343 B1 | 3/2002 | Glassock | |
| 6,390,548 B1 | 5/2002 | Cole | |
| 6,422,647 B1 | 7/2002 | Turudich | |
| 6,425,194 B1 | 7/2002 | Brie | |
| 6,445,378 B1 | 9/2002 | Flagg | |
| 6,450,906 B1 | 9/2002 | Touhey et al. | |
| 6,467,212 B1 | 10/2002 | Apel | |
| 6,499,703 B2 | 12/2002 | Chou | |
| 6,546,583 B1 | 4/2003 | Röhrig | |
| 6,588,023 B1 | 7/2003 | Wright | |
| 6,594,935 B2 | 7/2003 | Beretta | |
| 6,601,272 B2 | 8/2003 | Stvartak et al. | |
| 6,620,495 B1 * | 9/2003 | Kobayashi et al. | 428/316.6 |
| 6,631,568 B2 | 10/2003 | Howlett et al. | |
| 6,643,875 B2 | 11/2003 | Boso et al. | |
| 6,698,510 B2 | 3/2004 | Serra et al. | |
| 6,705,026 B1 | 3/2004 | Arbour | |
| 6,726,791 B1 | 4/2004 | Oelund et al. | |
| 6,797,765 B2 | 9/2004 | Pearce | |
| 6,802,140 B2 * | 10/2004 | Aslanides | 36/136 |
| 6,834,456 B2 | 12/2004 | Murello | |
| 6,880,269 B2 * | 4/2005 | Falone et al. | 36/44 |
| 6,893,366 B2 | 5/2005 | Falone et al. | |
| 6,922,862 B1 | 8/2005 | Thompson | |
| 6,944,974 B2 * | 9/2005 | Falone et al. | 36/44 |
| 6,991,691 B2 | 1/2006 | Yoon | |
| 7,037,571 B2 | 5/2006 | Fish et al. | |
| 7,048,879 B2 | 5/2006 | Kobayashi et al. | |
| 7,114,783 B2 | 10/2006 | Warren et al. | |
| 7,159,342 B2 * | 1/2007 | Grisoni et al. | 36/180 |
| 7,183,523 B2 | 2/2007 | Lu | |
| 7,424,760 B2 | 9/2008 | Chaffee | |
| 7,448,676 B2 | 11/2008 | Wyner et al. | |
| 8,091,963 B2 | 1/2012 | Wyner et al. | |
| 2001/0001351 A1 | 5/2001 | Dieckhaus | |
| 2001/0029632 A1 | 10/2001 | Parvin | |
| 2001/0055684 A1 | 12/2001 | Davis et al. | |
| 2002/0030295 A1 | 3/2002 | De Winter et al. | |
| 2002/0064641 A1 * | 5/2002 | Kobayashi et al. | 428/304.4 |
| 2002/0095091 A1 | 7/2002 | Martin | |
| 2002/0178621 A1 | 12/2002 | Darby | |
| 2002/0192452 A1 | 12/2002 | Harrison et al. | |
| 2003/0044313 A1 | 3/2003 | Lee | |
| 2003/0061663 A1 | 4/2003 | Lampel | |
| 2003/0070259 A1 | 4/2003 | Brown et al. | |
| 2003/0070321 A1 | 4/2003 | Davis et al. | |
| 2003/0080458 A1 | 5/2003 | Heilig et al. | |
| 2003/0106132 A1 | 6/2003 | Terris et al. | |
| 2003/0116883 A1 | 6/2003 | Thiessen | |
| 2003/0132359 A1 | 7/2003 | Brophy | |
| 2003/0135943 A1 | 7/2003 | Meyer et al. | |
| 2003/0136025 A1 | 7/2003 | Galbraith et al. | |
| 2003/0154567 A1 | 8/2003 | Drossler et al. | |
| 2003/0161999 A1 | 8/2003 | Kannankeril et al. | |
| 2003/0194526 A1 | 10/2003 | Vesley et al. | |
| 2004/0048688 A1 | 3/2004 | Hogge et al. | |
| 2004/0078998 A1 | 4/2004 | Davis et al. | |
| 2004/0089965 A1 | 5/2004 | Malfliet et al. | |
| 2004/0098806 A1 | 5/2004 | Stender et al. | |
| 2004/0134098 A1 | 7/2004 | Beck | |
| 2004/0144011 A1 | 7/2004 | Vignaroli et al. | |
| 2004/0154133 A1 | 8/2004 | Polzin et al. | |
| 2004/0191301 A1 | 9/2004 | Van Duren | |
| 2004/0209059 A1 | 10/2004 | Foss | |
| 2004/0247912 A1 | 12/2004 | Kim | |
| 2005/0008867 A1 | 1/2005 | LaBatt | |

| | | |
|---|---|---|
| 2005/0038368 A1 | 2/2005 | Richter et al. |
| 2005/0101693 A1 | 5/2005 | Arbogast et al. |
| 2005/0126038 A1 | 6/2005 | Skaja et al. |
| 2005/0210710 A1 | 9/2005 | Chen |
| 2005/0218555 A1 | 10/2005 | De Winter et al. |
| 2005/0241186 A1 | 11/2005 | Mulligan et al. |
| 2005/0287342 A1 | 12/2005 | Miyazaki et al. |
| 2005/0287346 A1 | 12/2005 | Miyazaki et al. |
| 2006/0010608 A1 | 1/2006 | DeFranks et al. |
| 2006/0075658 A1 | 4/2006 | Mitchell |
| 2006/0168710 A1 | 8/2006 | Vito et al. |
| 2006/0182787 A1 | 8/2006 | Jaenichen et al. |
| 2006/0205544 A1 | 9/2006 | Wyner et al. |
| 2006/0210773 A1 | 9/2006 | Kannankeril |
| 2006/0226578 A1 | 10/2006 | Farnworth et al. |
| 2006/0230643 A1 | 10/2006 | Affleck |
| 2006/0254088 A1 | 11/2006 | McCormick |
| 2006/0277788 A1 | 12/2006 | Fujii |
| 2006/0277801 A1 | 12/2006 | Schwarze et al. |
| 2006/0277950 A1 | 12/2006 | Rock |
| 2007/0031595 A1 | 2/2007 | Fox |
| 2007/0033834 A1 | 2/2007 | Cheskin et al. |
| 2007/0061978 A1 | 3/2007 | Losio |
| 2007/0072712 A1 | 3/2007 | Chernick et al. |
| 2007/0113317 A1 | 5/2007 | Garneau |
| 2007/0143942 A1 | 6/2007 | Fox et al. |
| 2007/0145795 A1 | 6/2007 | Wyner et al. |
| 2007/0199155 A1 | 8/2007 | Thygsen |
| 2007/0226911 A1 | 10/2007 | Gladney et al. |
| 2008/0034614 A1 | 2/2008 | Fox et al. |
| 2009/0090028 A1* | 4/2009 | Moramarco et al. .............. 36/96 |

FOREIGN PATENT DOCUMENTS

| | | |
|---|---|---|
| WO | WO97/26821 | 7/1997 |
| WO | WO2004/007166 | 1/2004 |
| WO | WO2005/004658 | 1/2005 |
| WO | WO2005/004936 | 1/2005 |
| WO | WO2007/019009 | 2/2007 |
| WO | WO2007/033342 | 3/2007 |
| WO | WO2007/076477 | 7/2007 |
| WO | WO2007/076482 | 7/2007 |
| WO | WO2007/092091 | 8/2007 |
| WO | WO2007/100922 | 9/2007 |

OTHER PUBLICATIONS

Teknor Apex: Monprene: www.teknorapex.com.

* cited by examiner

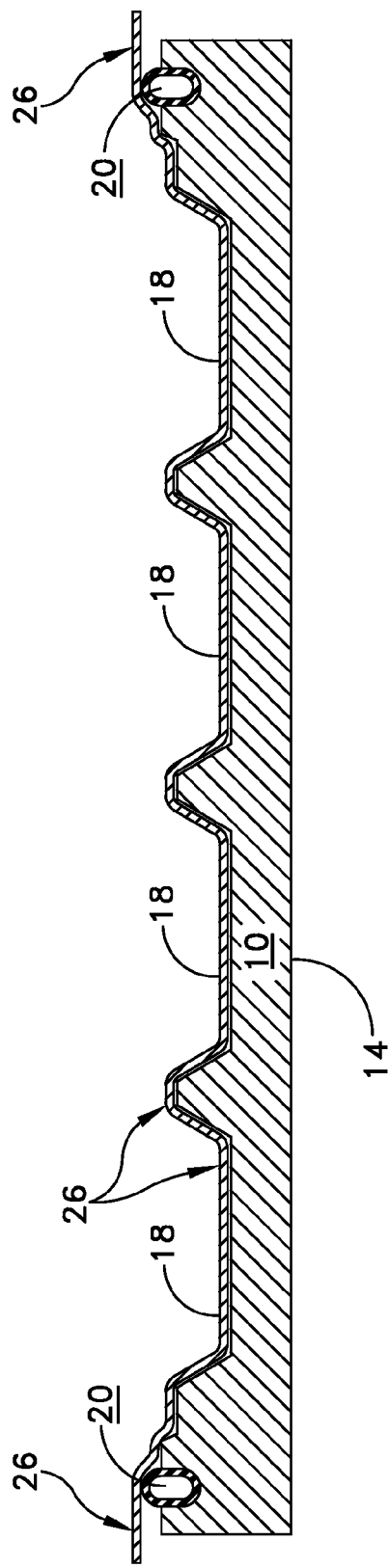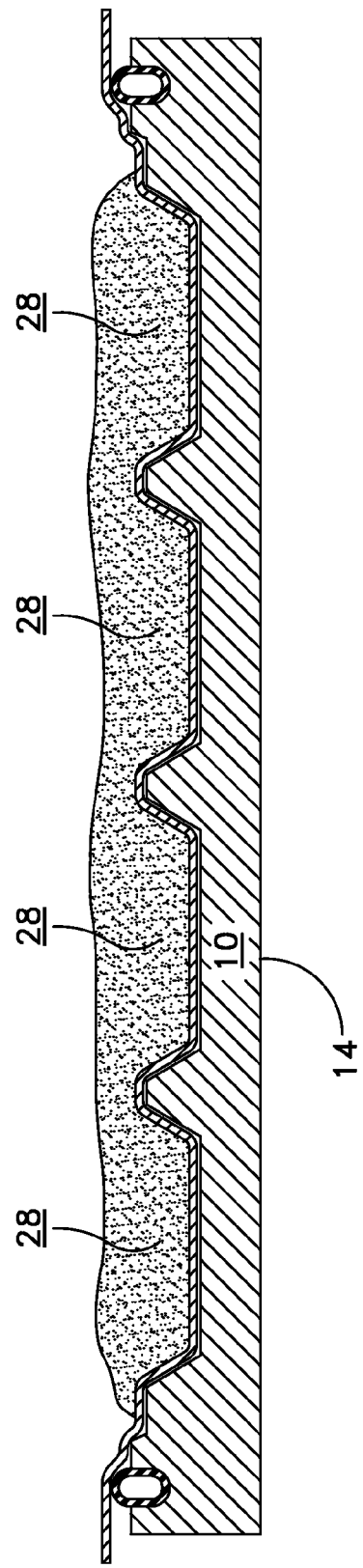

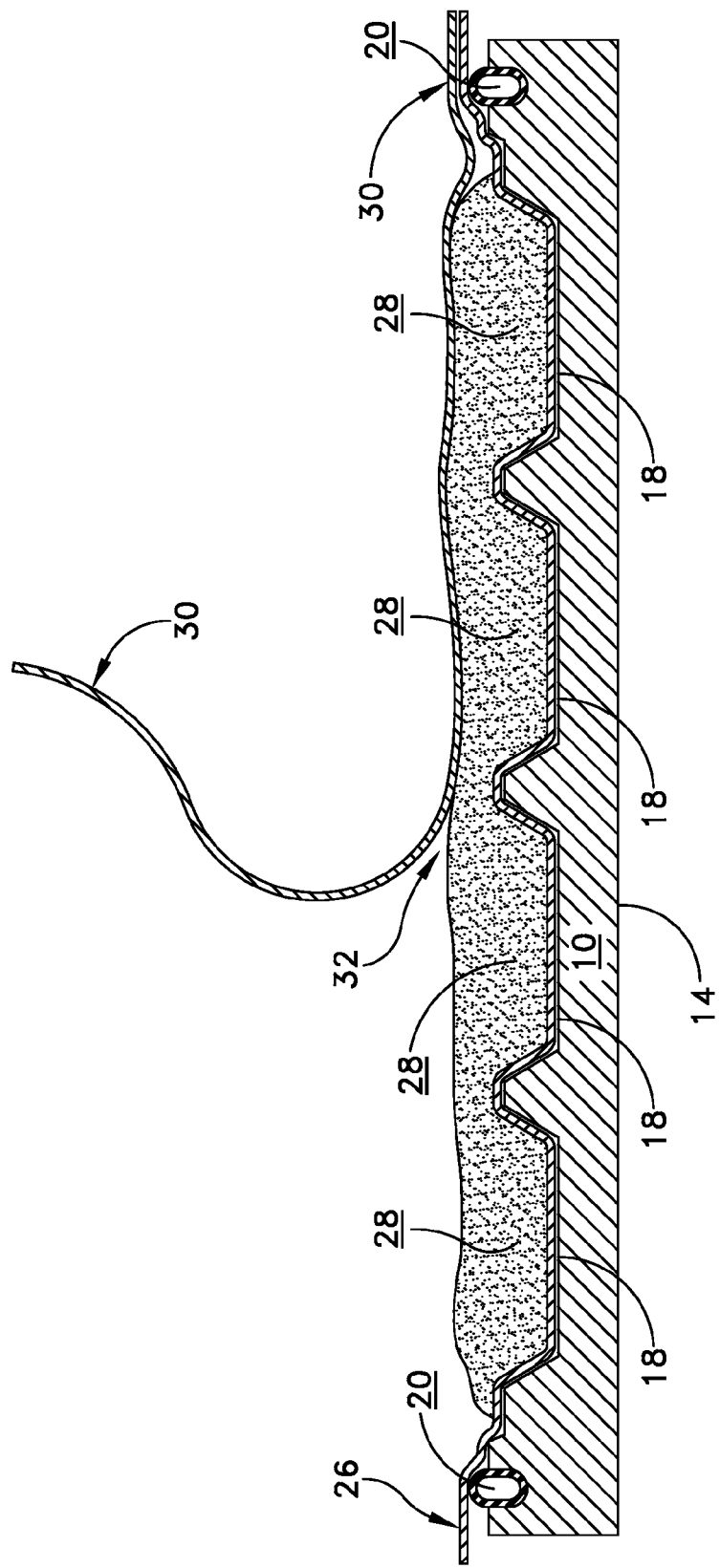

METHODS OF MAKING POLYMERIC ARTICLES AND POLYMERIC ARTICLES FORMED THEREBY

TECHNICAL FIELD

The present disclosure relates to methods of molding articles and the articles formed thereby and, in particular, to methods of molding viscoelastic gel articles and the articles made thereby.

BACKGROUND

Many frequently used objects comprise materials that are hard to the human touch and/or result in friction when disposed against a human body, especially in repetitive motions. It is generally thought desirable to make the body contacting regions of such objects as soft as possible in order to make their use more comfortable for a user e.g., by reducing pressure and/or friction. "Body contacting," as used herein, means contacting a user's skin and/or clothing. Many attempts have been made to make such objects or the body contacting regions of such objects more comfortable for a user. For example, relatively rigid razor and toothbrush handles have been provided with regions of softer materials, including disposing the softer regions with "fins," which bend more easily at thin gauge. Hairbrushes have been provided with a sheath of relatively soft polymeric material disposed about a rigid handle. Luggage, backpack, briefcase and purse handles have been provided with relatively thick padded handles. In addition, for commercial and/or aesthetic reasons it is often desirable to include color, text and/or graphics in such objects, which can be difficult and/or expensive.

A need exists in the art for improved methods of making polymeric articles.

SUMMARY

The present disclosure is directed, in one embodiment, to a self-adhesive shoe insert that comprises a thermoplastic elastomeric (TPE) barrier layer; a fluid-permeable layer; and a first polymerized gel layer disposed between and enclosed by the barrier layer and the fluid-permeable layer, wherein at least a portion of the first polymerized gel layer extends at least partially through the fluid-permeable layer. In one embodiment, the shoe insert can comprise a second layer of polymerized gel, wherein the first and second polymerized gel layers are at least partially interconnected through the fluid-permeable layer. The first and second polymerized gel layers each comprise a hardness ranging from about 30 Shore 000 to about 75 Shore 00. In one embodiment, the polymerized gel is transparent and the fluid-permeable layer comprises color, text, graphics, and combinations thereof, which are visible through the gel.

Another embodiment is directed to a method of molding an article, comprising: selecting a first mold section comprising an upper surface, the upper surface comprising a recessed region, and the recessed region comprising a plurality of mold units disposed therein; disposing a barrier layer onto the upper surface of the first mold section, the barrier layer comprising a thermoplastic elastomeric (TPE) material; dispensing a first portion of a gel precursor onto the barrier layer; disposing a fluid-permeable material layer over the gel precursor; disposing a stabilization layer over the fluid-permeable material layer and forming an interface between the gel precursor and the fluid-permeable material layer; advancing the interface while applying pressure to the stabilization layer adjacent to the interface, until the gel precursor is covered by the fluid-permeable material layer; closing the mold; allowing the gel precursor to cure; and removing a sheet comprising a plurality of molded articles interconnected by a layer of polymerized gel. The gel precursor is allowed to flow through the fluid-permeable layer. The polymerized gel layer can comprise a hardness ranging from about 30 Shore 000 to about 75 Shore 00.

The above described and other features are exemplified by the following figures and detailed description.

DRAWINGS

Other advantages, novel features, and uses of the invention will become more apparent from the following detailed description of non-limiting embodiments of the disclosure when considered in conjunction with the accompanying drawings, which are schematic and which are not intended to be drawn to scale. In the figures, each identical, or substantially similar component that is illustrated in various figures is typically represented by a single numeral or notation. For purposes of clarity, not every component is labeled in every figure, nor is every component of each embodiment of the invention shown where illustration is not necessary to allow those of ordinary skill in the art to understand the invention. In the drawings:

FIG. 4 shows the application of a barrier layer to the mold shown in FIG. 3;

FIG. 5 shows the application of a gel precursor to the barrier layer shown in FIG. 4;

FIG. 6 shows the application of a stabilization layer to the gel precursor shown in FIG. 5;

DETAILED DESCRIPTION

The present disclosure is directed to methods of molding articles and the articles made thereby. The method provides an inexpensive method of molding a variety of commodity products comprising various degrees of hardness.

In particular, gels having relatively low durometers, such as viscoelastic gels, can be extremely tacky, making them difficult or impossible to use in commercial processing techniques such as injection molding, because the materials will adhere to the molds. In addition, such materials have relatively low durability in comparison to other materials, including other polymeric materials. Thus, applications for relatively low durometer gel materials have been limited, despite their advantageous pliability and softness characteristics. Thus, one embodiment is a method of molding a polymeric material, in particular, a viscoelastic polymeric material (hereinafter referred to as "gel"). It should be understood that the method is not limited to polymeric materials, and that materials other than polymeric materials can be molded with the method (e.g., composite materials, and the like).

Figure 1:
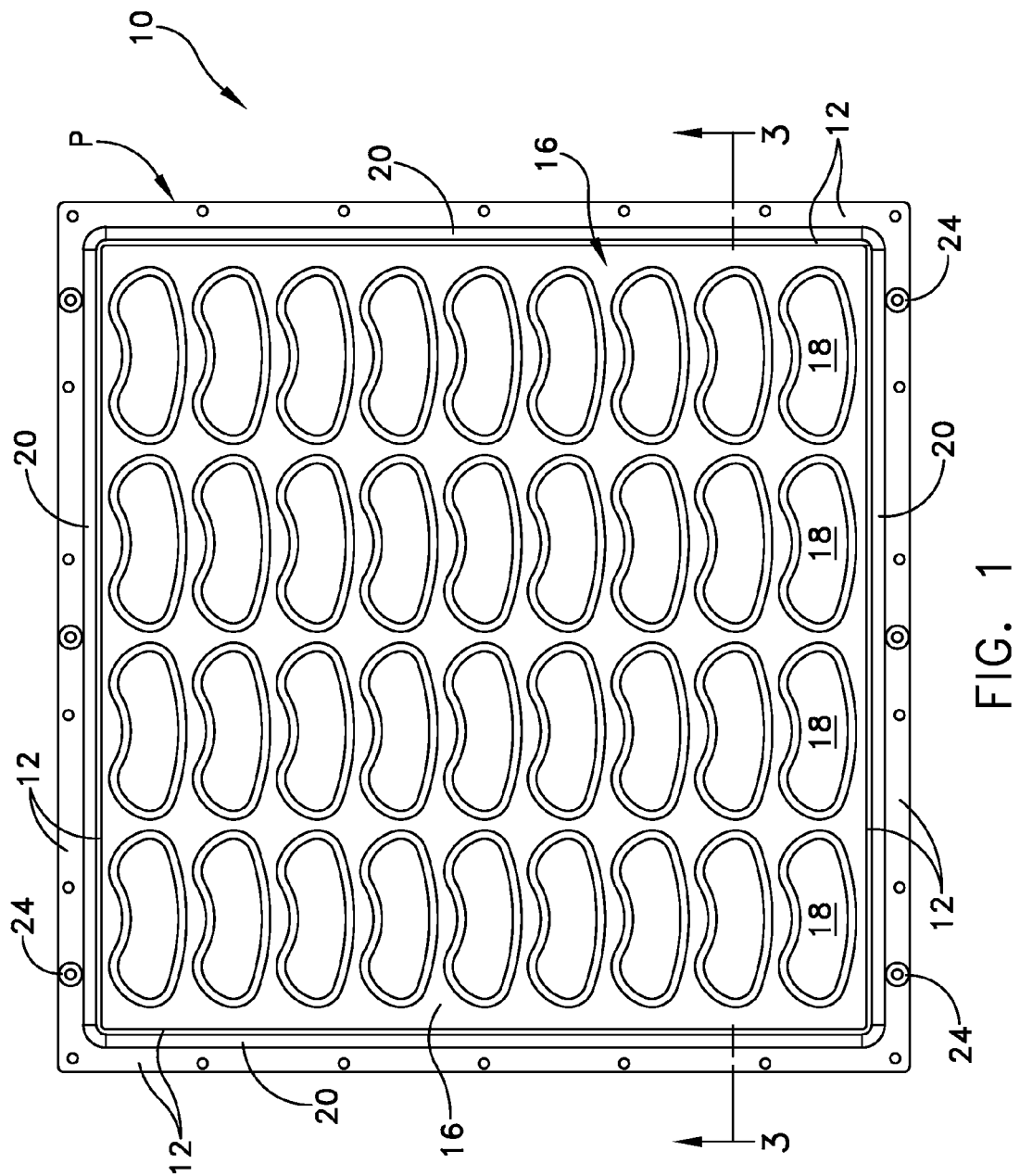
FIG. 1 is a perspective view an exemplary mold that can be used in the method according to the present disclosure.
Figure 2:
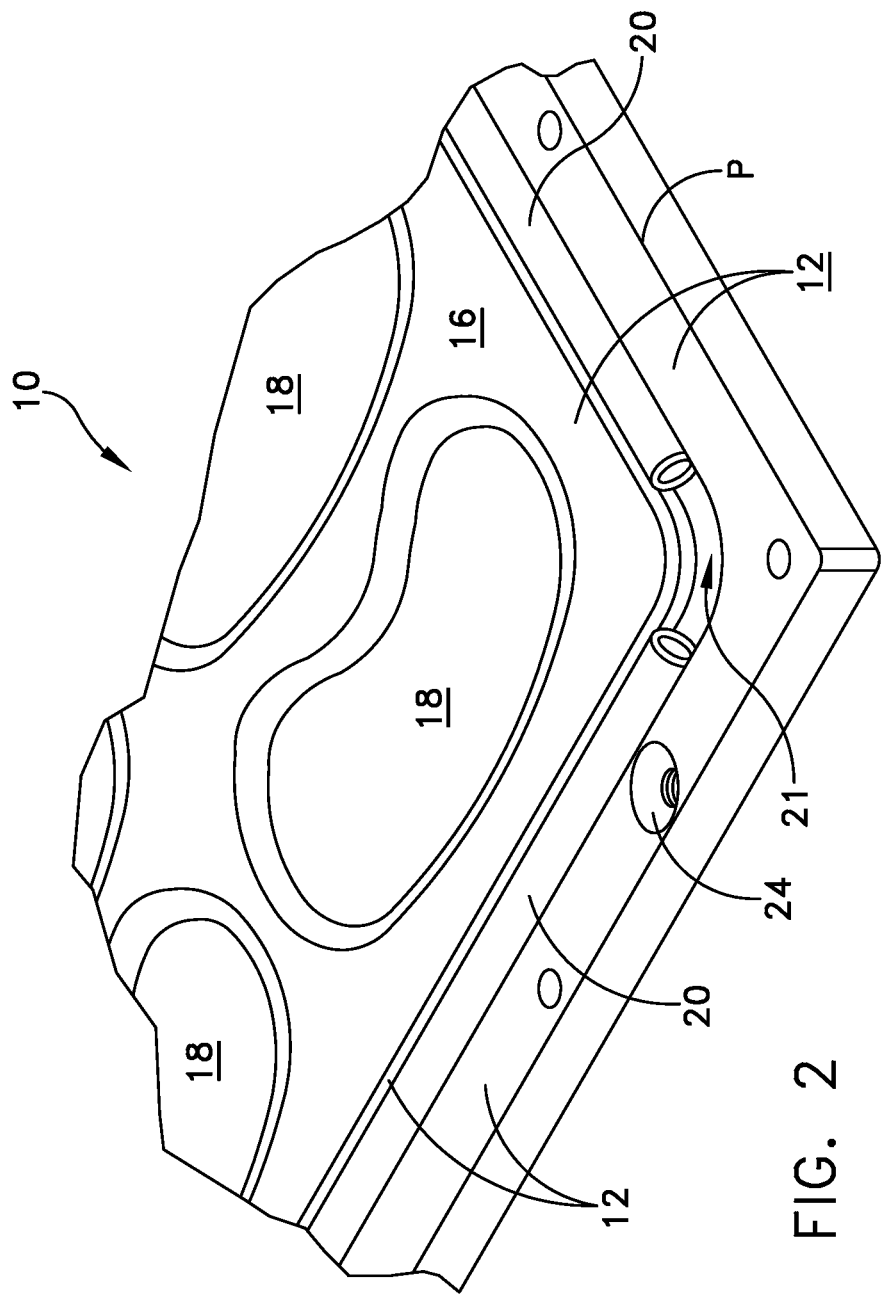
FIG. 2 is an enlarged perspective view of a portion of the mold shown in FIG. 1.
Figure 3:
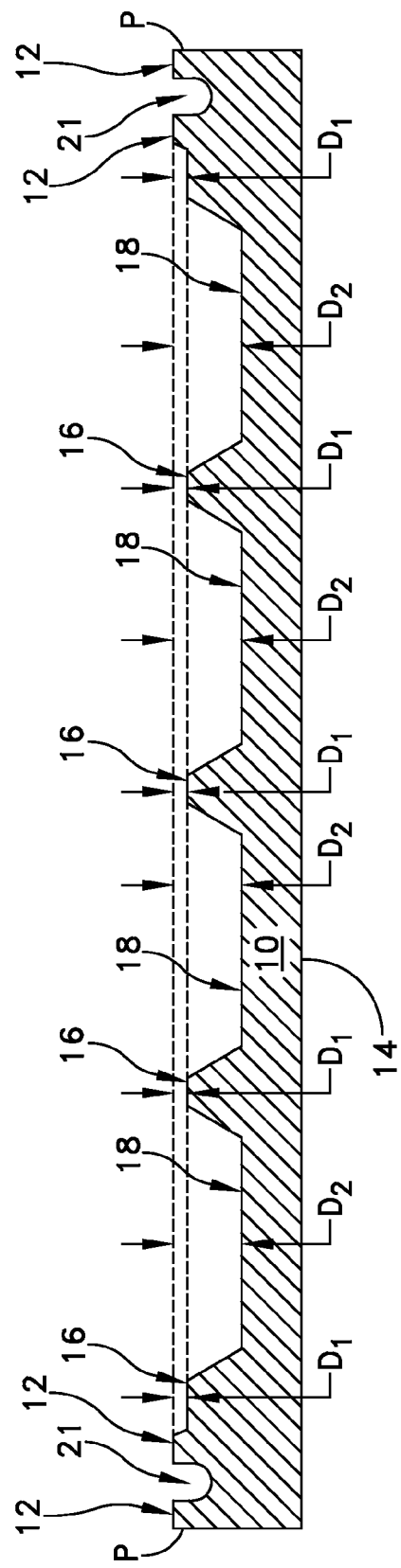
FIG. 3 is a cross-sectional schematic view of the mold shown in FIG. 1, through line 3-3.

FIGS. 1-11, when taken together, illustrate an exemplary method for forming gel articles. The present method involves selecting a suitable mold 10 for the desired product, as shown in FIGS. 1-3, which can comprise opposing upper and lower surfaces 12, 14. As shown, mold 10 can comprise a recessed region 16 defined in the upper surface 12 of the mold, which is recessed from the upper surface 12 by a depth "$D_1$". It should be understood that the terms "bottom" and "top," and/or "upper" and "lower" are used herein, unless otherwise noted, merely for convenience of description, and are not limited to any one position or spatial orientation. Also, it should be understood that the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. Further, unless defined otherwise, technical and scientific terms used herein have the same meaning as is commonly understood by one of skill in the art to which this disclosure belongs.

The present exemplary mold 10 comprises thirty-six (36) individual mold units 18 defined in the recessed region 16, each of which corresponds to the shape and size of the desired final molded product 19, which in this instance is a shoe heel liner. Although illustrated herein as a shoe heel liner for the sake of convenience, it should be understood that a variety of products can be molded using the present method. Each of the thirty-six (36) individual mold units 18 is recessed from the upper surface 12 by a depth "$D_2$", which corresponds to the desired thickness of the final molded product 19.

Mold 10 also can comprise a gasket recess 21 disposed between the recessed region 16 and the perimeter "P" of the mold 10, in which a gasket 20 can be disposed. Alternatively, gasket 20 can be disposed directly on the upper surface 12 of the mold 10. Gasket 20 can provide a seal sufficient to restrict the flow of polymer from the mold 10. Gasket 20 or mold 10 can comprise periodic openings 22 to allow entrapped air to flow out of the mold 10 during the molding process. For example, as shown, gasket 20 can comprise openings 22. Optionally, the mold 10 can comprise one or more registration guides 24 (e.g., pins, studs, and the like).

As shown in FIG. 4, after selection of a suitable mold 10, the method can comprise disposing a barrier layer 26 onto the mold 10. The barrier layer 24 can be disposed onto the mold 10 as a sheet of material, or as a coating applied directly onto the mold. When applied as a sheet 24, then barrier layer 24 can be applied onto the mold and in physical contact with the gasket 20. When applied as a sheet, then the barrier layer 26 also can comprise registration guides (e.g., holes, perforations, etc., and the like) corresponding to the registration guides 24 in the mold 10, in order to aid in its alignment to the mold 10 and to subsequent layers. If the barrier layer 26 is not disposed as a sheet, then it can be disposed directly onto the upper surface 12 of mold 10. If desired, a release coating may be used to assist in releasing the barrier layer 12 from the upper surface 12 of mold 10.

As shown in FIG. 5, after disposing the barrier layer 26 onto the upper surface 12 of the mold 10, a gel precursor 28 can be dispensed onto the barrier layer 26. "Gel precursor," as used herein, means a fluid material that has not yet cured to form a gel. The gel precursor 28 can be disposed onto the barrier layer 26 using a variety of techniques such as, but not limited to, pouring, injecting, and/or the like.

Dispensing the gel precursor 28 can comprise pouring a sufficient amount (e.g., volume) of the gel precursor to fill each of the thirty-six (36) individual mold units 18, rather than filling a single mold unit 18, as in other processes such as injection molding. For example, other methods, such as injection molding, may involve dispensing the gel precursor 28 separately to each mold unit 18. Therefore, using the present mold, thirty-six (36) separate dispensing steps would be required. In contrast, the present method can comprise dispensing the gel precursor 28 once onto the barrier layer 26 (e.g., a single "pour"), and the single dispensation of gel precursor 28 can provide a sufficient amount of gel precursor 28 to form all of the mold units 18 in a single molding cycle. Dispensing the gel precursor 28 in bulk, rather than separately, can substantially reduce the manufacturing time of the present method in comparison to other methods.

Figure 7:
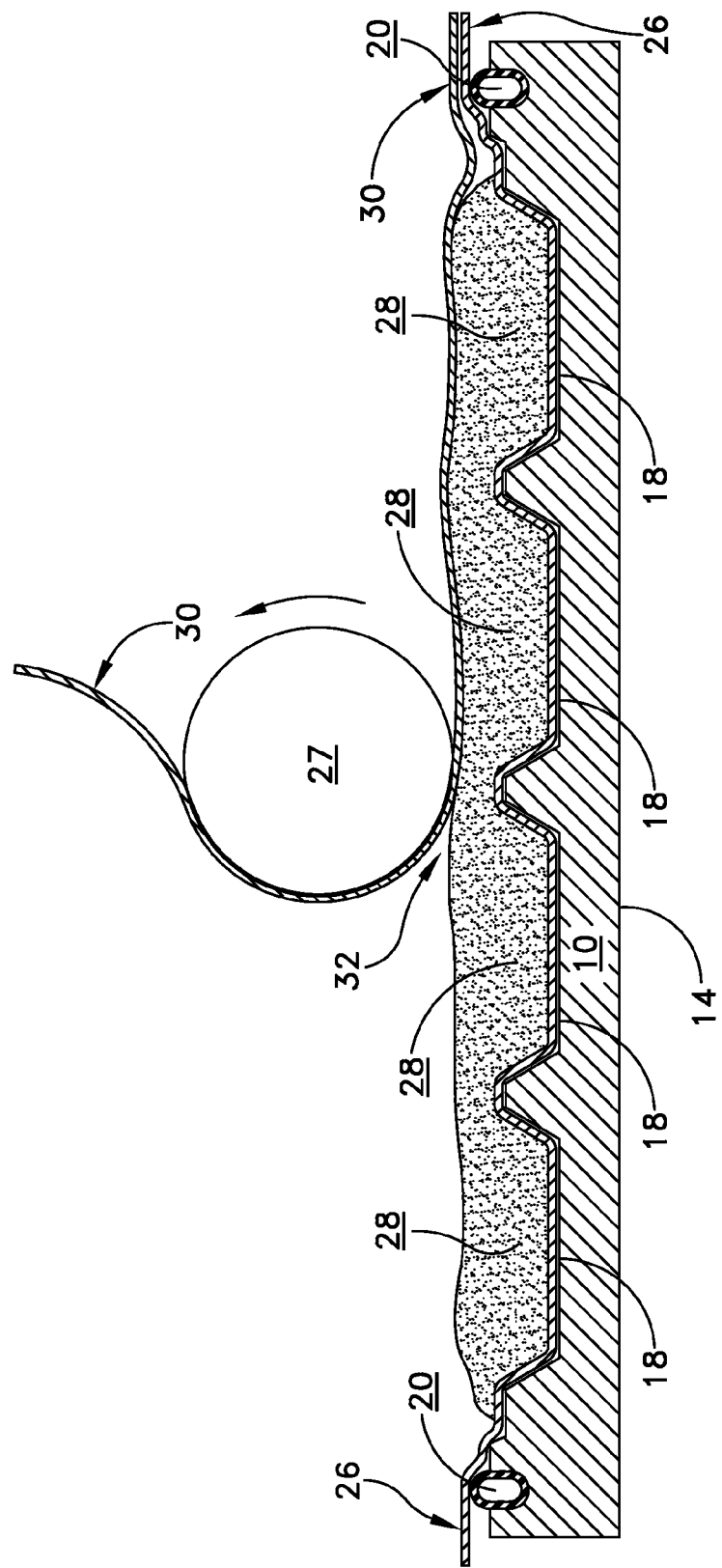
FIG. 7 shows the method of advancing the stabilization layer over the gel precursor shown in FIGS. 5 and 6.
Figure 8:
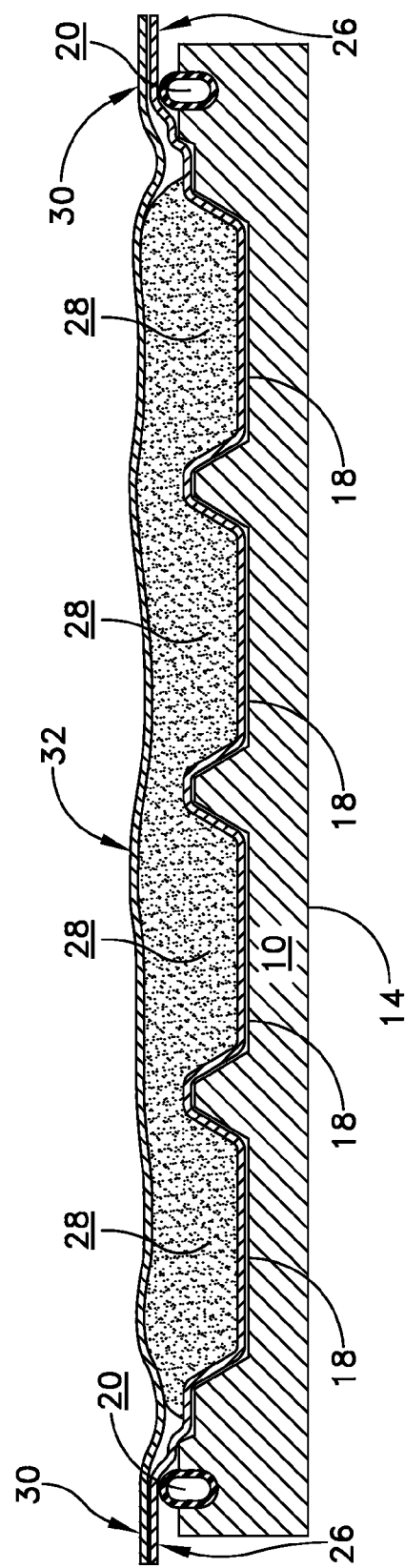
FIG. 8 shows the stabilization layer covering the gel precursor.

As shown in FIG. 6, after dispensing the gel precursor 28 onto the barrier layer 26, a stabilizing layer 30 can be disposed over the gel precursor 28, for example, as a sheet. If mold 10 comprises registration guides 24, then the stabilizing layer 30 also can comprise corresponding registration guides (not illustrated) to aid in its alignment to the mold 10 and to any subsequent layers. Disposing the stabilizing layer 30 onto the gel precursor can comprise disposing a portion of the stabilizing layer 30 onto a portion of the gel precursor 28 such that an interface 32 exists between the gel precursor 28 and the stabilizing layer 30. Disposing the stabilizing layer 30 onto the gel precursor 28 can be performed manually, with a tool such as a roller, as shown in FIG. 7, or the process can be automated. The remaining portion of the stabilizing layer 30 can be advanced onto the remaining portion of the gel precursor 28 by applying pressure to the stabilizing layer 30 behind the interface 32, and advancing the interface 32 until the stabilizing layer 30 covers the entire gel precursor 28, as shown in FIG. 8. The application of pressure while advancing the stabilizing layer 30 substantially minimizes the formation of air bubbles between the gel precursor 28 and the stabilizing layer 30.

Figure 9:
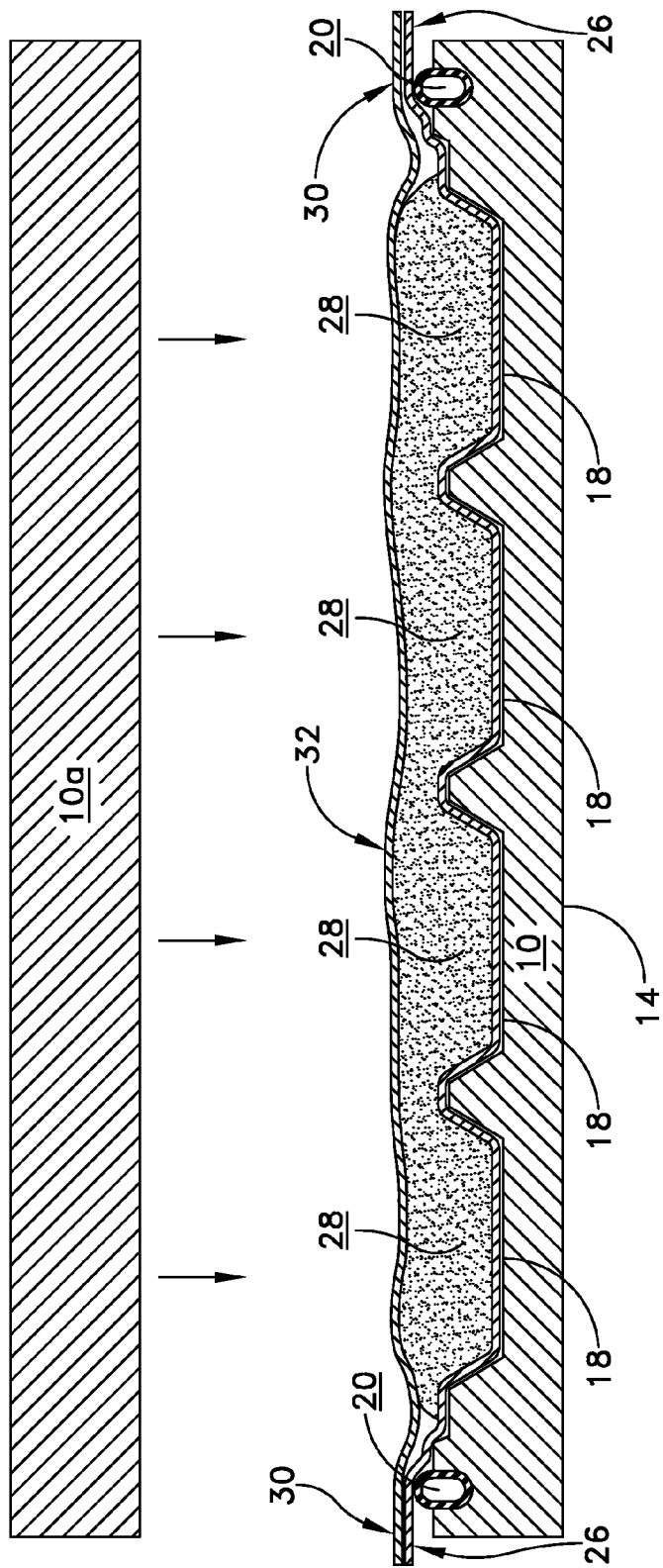
FIG. 9 shows the mold being closed.

As shown in FIG. 9, the mold 10 can be closed, for example by disposing a mold cover 10a over the stabilizing layer 30. When the mold 10 is closed, the gel precursor 28 can flow into all regions of the mold 10 defined by the gasket 22, and any entrapped air can flow out of the mold through gasket openings 21.

Figure 10:
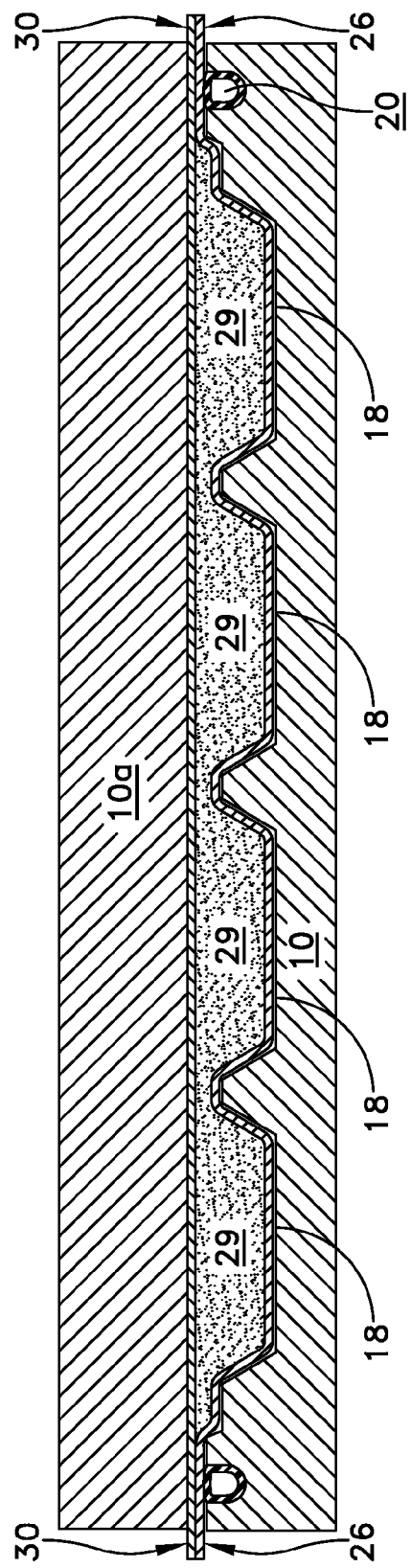
FIG. 10 shows the mold after closure and the polymerization of the gel precursor.

As shown in FIG. 10, the gel precursor 28 can be allowed to form a polymerized gel 29 in the closed mold 10 for a predetermined period of time (e.g., 30 seconds to 5 minutes). If desired, pressure and/or a vacuum can be applied to the mold for various reasons e.g., to increase the speed of processing, to improve the quality of the final material, to change the surface characteristics of the polymerized gel, and/or the like. As a result, the overall processing time for producing a plurality of molded products 19 can be substantially reduced in comparison to other methods such as injection molding. In addition, because the time used to dispense the gel precursor 28 is reduced in comparison to other methods, it is possible to increase the speed of curing by varying a number of factors such as, for example, pressure, temperature, catalyst concentration (when used), and/or the like. The use of pressure and/or vacuum during the molding process can be desirable when the articles to be formed require more definition such as undercuts, and the like. When vacuum forming or thermoforming, it can be desirable to utilize molds formed at least in part from a porous composite material, which allows the formation of intricate details and surface patterns in the molded article, and eliminates the necessity for vent holes in the mold. One example of such a porous composite material is breathable aluminum, which is available commercially under the brand name METAPORT™.

Figure 11:
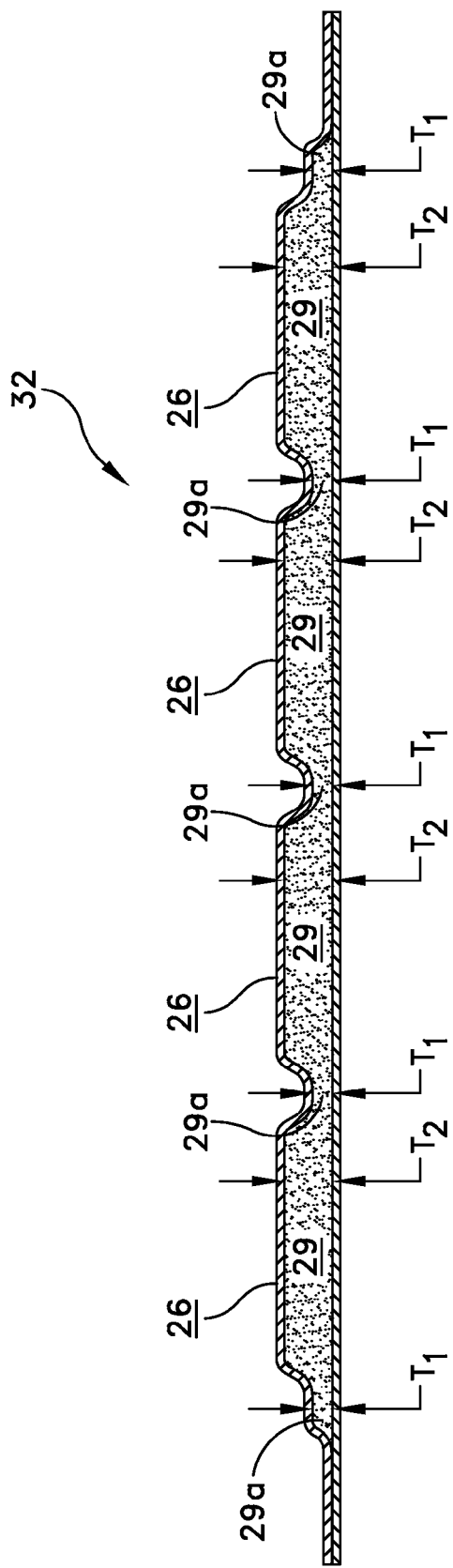
FIG. 11 shows a sheet of material containing a sheet of molded units interconnected by a layer of gel, after removal from the mold.

After curing, the mold 10 can be opened, and a sheet 32 comprising the molded products 19 can be removed from the mold 10, as shown in FIG. 11. The presence of the barrier layer 26 and the stabilization layer 30 can facilitate the handling of the sheet 32 because the polymerized gel 29 is encapsulated by the layers 26,30, which can be advantageous when the polymerized gel 29 has adhesive properties that would otherwise cause it to adhere to surfaces such as the mold surface, a user's hand, and the like. The sheet 32 comprises a plurality of relatively thin regions 29a of the polymerized gel 29 disposed between the barrier layer 26 and the stabilization layer 30, and interconnecting the molded products 19. The regions 29a of polymerized gel can comprise a thickness "$T_1$" corresponding to the depth $D_1$ of the recessed region 16 of mold 10. In order to minimize waste, the depth $D_1$ of the recessed region 16 can be selected to be as small as possible while still allowing unrestricted flow of the gel precursor 28 into the region defined by the gasket 22. Thus, the depth $D_1$ and thickness "$T_1$" of can be varied.

The molded products 19 can be separated from the sheet 32 and from each other by cutting (e.g., die cutting, and the like) through the barrier layer 26, polymerized gel regions 29a and stabilization layer 30. The molded products 19 can be die cut between the polymerized gel regions 29 and 29a and/or through the polymerized gel region 29. When the polymerized gel 29 has adhesive properties, then it may be desirable to die cut through a portion of the polymerized gel regions 29 adjacent to the polymerized gel region 29a, such that the sides of the molded units 19 comprise an exposed region of polymerized gel. During die cutting, the presence of the stabilization layer 30 prevents or minimizes the polymerized gel 29 and barrier layer 26 from shrinking, thereby substantially maintaining the dimensions of the molded products 19 in comparison to the dimension of the mold units 18. Because shrinkage of the molded products 19 can be minimized, it may not be necessary to factor shrinkage into the design of the molds, as may be necessary with other methods.

Figure 15:
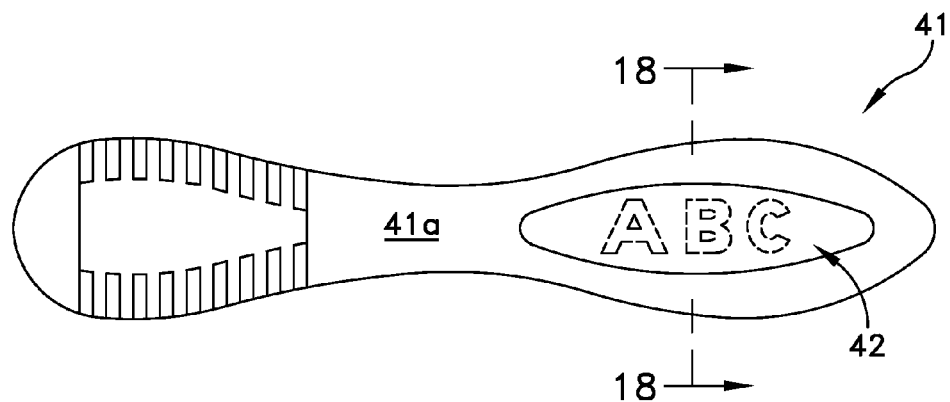
FIG. 15 is a top view of an exemplary rigid toothbrush handle with a gel handle insert according to the present disclosure, with text shown in phantom.
Figure 16:
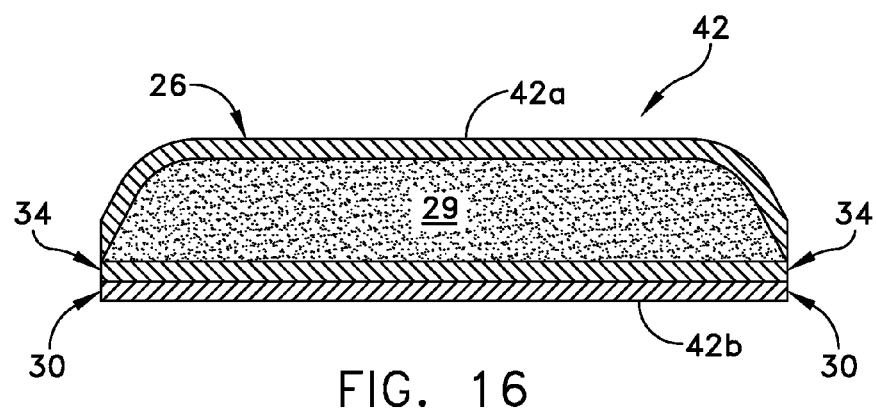
FIG. 16 is a cross-sectional view of the handle insert of FIG. 15, through line 16-16, showing a fabric layer between the gel layer and the stabilizing layer.
Figure 17:
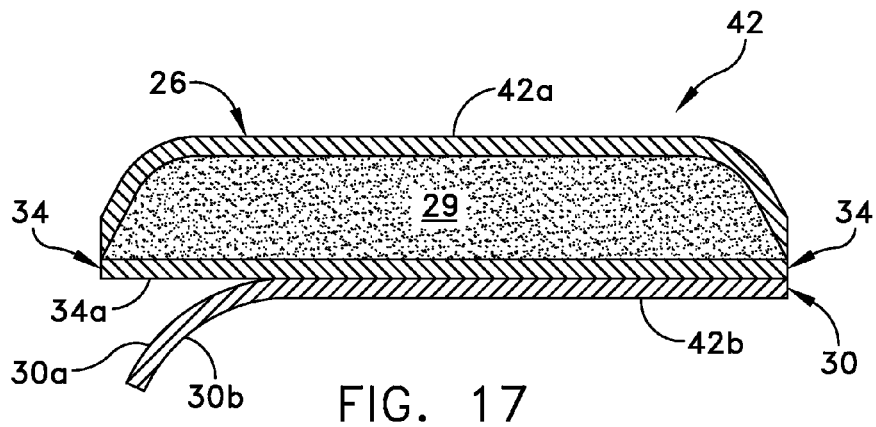
FIG. 17 is a cross-sectional view of the handle insert of FIG. 16, showing release of the stabilizing layer from the insert.
Figure 18:
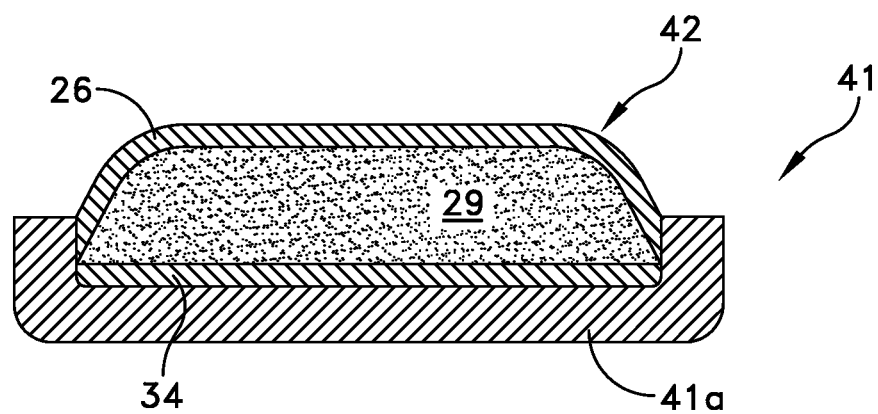
FIG. 18 is a cross-sectional view of the rigid toothbrush handle, through lines 18-18, showing the gel insert disposed in a recess in the rigid handle.

Optionally, a layer 34 of the same or different material can be disposed between any of the foregoing layers e.g., between the stabilization layer 30 and the polymerized gel 29 and/or between the polymerized gel 29 and the barrier layer 26. Also optionally, layer 34 can be disposed in the gel 29 e.g., by disposing a first portion of the gel precursor 28 onto the barrier layer 26, disposing the layer 34 over the first portion of the gel precursor 28, and disposing a second portion of gel precursor 28 over the layer 34. Layer 34 can comprise a variety of synthetic and/or non-synthetic materials including, but not limited to, paper, fabric, plastic film, and/or the like, as well as composites and/or combinations comprising at least one of the foregoing. When layer 34 comprises a fabric layer, the fabric can be knit, woven, non-woven, synthetic, non-synthetic, and combinations comprising at least one of the foregoing. Disposing a fabric layer as layer 34 can be advantageous because it can trap and disperse air bubbles that may otherwise form in or between the layers, resulting in a better appearance for the final molded products 19. Layer 34 also can comprise color, graphics and/or indicia, including text. The color, graphics and/or indicia disposed on layer 34 can be transmitted through other layers when they are formed from colorless and/or transparent materials, which can be desirable for aesthetic and costs reasons, as best shown in FIG. 15. In addition, if desired, layer 34 can be fluid-permeable. "Fluid-permeable," as used herein, means that the material from which layer 34 is formed is open to passage or entrance of a fluid material, such as the gel precursor.

Also optionally, layer 34 can be used in place of the stabilization layer 30. If layer 34 replaces stabilization layer 30, then it can be applied in the same manner described above with respect to stabilization layer 30.

In some instances, it may be desirable to be able to adhere the molded products 19 to various surfaces. Therefore, optionally, an adhesive (not illustrated) may be disposed on one or more surfaces of the final molded products 19. Also optionally, an adhesive can be disposed and/or on one or more surfaces of layers 26, 28, 30 and 34. For example, with reference to FIG. 11, an adhesive can be disposed on surface 30b, and the adhesive can be supported by a release and/or support layer (not illustrated). Some possible adhesives can comprise pressure sensitive adhesives, thermoplastic adhesives, and the like, as well as combinations comprising at least one of the foregoing. One example of such a material is available from 3M as product number 7026.

In some instances, the polymerized gel 29 may comprise sufficient adhesive strength to be adhered to a surface in the absence of a separate adhesive. In such instances, it may be desirable that the stabilizing layer 30 can be capable of manual release from the polymerized gel 29. Therefore, optionally, the stabilizing layer 30 can comprise a release coating (not illustrated) such as silicone, disposed on surface 30a, which can assist in the manual release of the stabilizing layer 30 from the polymerized gel 29.

A variety of materials can be used in the foregoing methods to make the foregoing molded products 29. The barrier layer 26 can comprise any material capable of providing sufficient elasticity to prevent tearing and/or stretching when a force is applied thereto; sufficient structural integrity to be formed into predetermined shapes; and that is capable of withstanding the environment in which it is intended to be used, without substantial degradation. The barrier layer 26 also can be selected to facilitate the handling of the polymerized gel layer, which can comprise adhesive characteristics in some instances. Therefore, after molding, the barrier layer 26 can be selected to comprise a relatively non-tacky surface and a relatively smooth feel to the human touch. Some possible materials for the barrier layer 26 include polyolefins, polystyrenes, PVC, latex rubber, and thermoplastic elastomers (TPEs), and/or the like, and combinations comprising at least one of the foregoing materials. Some possible TPE materials include polyurethane, silicone, and/or the like, and combinations comprising at least one of the foregoing materials. The barrier layer 26 can comprise an elongation of about 100 percent (%) to about 1500%, more particularly about 200% to about 1000%, and more particularly still about 300% to about 700%". It should be understood that the modifier "about" used in connection with a quantity is inclusive of the stated value and has the meaning dictated by the context (e.g., includes the degree of error associated with measurement of the particular quantity).

Barrier layer 26 can comprise any thickness. For practical purposes it has been found that thinner layers can provide improved hand-feel, while thicker layers can provide increased durability. Therefore, it can be desirable to use the thinnest barrier layer possible in order to prevent punctures in the barrier layer 26. When the polymerized layer 29 is tacky, puncturing the barrier layer 26 can expose the underlying tacky material of the polymerized gel 29, making it difficult to handle. Barrier layer 26 can comprise a thickness ranging from about 0.2 milli-inch (hereinafter "mil") to about 5 mil, more particularly from about 0.5 mil to about 3 mil, and more particularly still from about 0.6 mil to about 2 mil.

As noted above, barrier layer 26 can be applied as a sheet of material during the molding process. In the form of a sheet, and especially when the barrier layer is relatively thin, the barrier material can be very flexible and may wrinkle and/or fold very easily during handling. Therefore, the barrier layer 26 also can comprise a support layer (not illustrated), which assists in handling the material. If the barrier layer 26 comprises such a supporting layer, then the supporting layer can be disposed adjacent to the upper surface 12 of the mold 10, with the barrier layer material facing away from the upper surface 12, which can be removed prior to die cutting, if desired or necessary.

Also as noted above, if barrier layer 26 is not applied as a sheet, then it can be applied as a coating of material during or after the molding process. If applied after the molding process, then the barrier layer can be disposed onto the gel 28 after formation of the molded units 18, for example by painting, spraying, brushing manually, and/or the like. When the barrier layer 26 is not disposed as a sheet or is not disposed as a coating during the molding process, and then the gel precursor 28 can be disposed directly onto the upper surface 12 of mold 10, which may require the use of a release agent on the upper surface 12.

The polymerized gel 29,29a can comprise any polymeric material comprising sufficient structural integrity to be formed into predetermined shapes, including foam polymeric materials; and that is capable of withstanding the environment in which it is intended to be used, without substantial degradation. The hardness of the material (e.g., the gel materials) can be selected to provide articles and/or regions of articles with a predetermined hardness, which can be tailored for specific cushioning and/or wear resistance applications. The polymerized gel 29,29a can comprise a durometer ranging from about 30 Shore 000 to about 88 Shore D. The durometer of the gel can be determined using a tool such as a durometer.

Examples of suitable polymeric materials include, but are not limited to, thermosetting polymeric materials, elastomeric polymeric materials, thermoplastic materials, including thermoplastic elastomeric materials, and combinations comprising at least one of the foregoing. Some possible polymeric materials include, but are not limited to, polyurethane, silicone, and/or the like, and combinations comprising at least one of the foregoing materials. Examples of other materials include, but are not limited to, composite materials, and the like.

Formation of the gel precursor 28 can take place by a variety of methods known to those of skill in the art. For example, formation of a polyurethane gel can comprise reacting suitable pre-polymeric precursor materials e.g., reacting a polyol and an isocyanate in the presence of a catalyst.

In some instances, it can be desirable for the gel to be sufficient softness and/or pliability to provide comfort against a body. In such instances, gel can comprise a durometer ranging from about 0.01 Shore 00 to less than or equal to about 70 Shore A, more particularly less than 70 Shore 00, more particularly still less than 60 Shore 00.

In some embodiments, it can be desirable for the gel to have sufficient adhesive strength to adhere to a selected surface (such as the inner surface of a shoe) which can eliminate the need for a separate adhesive to adhere the molded units to a desired surface. It is possible to vary the adhesive strength of the gel by varying, for example, the durometer of the material used to form the layer. In such instances, the polymerized gel can comprise, for example, a durometer of about 30 Shore 000 to about 85 Shore 00. Gel materials in such relatively low durometer ranges can comprise a jelly-like consistency. One possible material having such adhesive characteristics is a polyurethane gel comprising a durometer in the range of about 70 Shore 00 to about 85 Shore 00, which can provide sufficient adhesive strength to adhere to a desired surface, such as the surface of an inner shoe, or a rigid plastic such a polypropylene.

Again, although illustrated herein as a gel, other materials can be used to form layers and/or regions 29,29a such as, for example, composite materials.

The gel 29 and/or the barrier layer 26 can comprise one or more additives such as, but not limited to, modifiers, coloring agents, stabilizers, phase changing materials, ultraviolet inhibitors, and/or active agents as well as combinations comprising at least one of the foregoing. The concentration of the additive can be varied depending on the desired effectiveness of the agent.

One possible phase changing material can comprise phase changing microspheres (available under the product name Outlast), which contain materials that can change phases at near body temperature. As a result, heat energy can be stored in the barrier layer, resulting in a product that can feel cool or warm.

Suitable active agents can comprise tolnaftate, undecenoic acid, allylamines, chlorine, copper, baking soda, sodium omadine, zinc omadine, azoles, silver, and/or the like, and combinations comprising at least one of the foregoing. For example, silver can provide an antifungal/antibacterial effect. For purposes of economy and effectiveness, it has been found advantageous to include active agents, when used, in the barrier layer 26. Because the barrier layer 26 is relatively thin in comparison to the gel 29, disposing such agents in the barrier layer 26 allows the use of reduced total amounts of the agents to achieve similar effective concentrations in comparison to thicker layers, thereby reducing costs associated with the additives. Also, disposing such agents in the barrier layer 26 ensures that the agents are disposed in the outermost layer of the article i.e., the body contacting regions, rather than in regions remote from the user, which can increase the effectiveness of the agents.

In some instances, it may be desirable to use colorless materials for each of the barrier, polymerized gel and stabilization layers, which can be desirable for aesthetic reasons. For example, it can be desirable to use colorless shoe inserts, particularly in women's shoes, which are sometimes open-toed, or open-heeled. In another embodiment, when layer 34 is included in the structure, and the layer includes color, graphics and/or indicia, it can also be desirable to use colorless and/or transparent materials because the color, graphics and/or indicia will be visible through the layers.

The stabilizing layer 30 can comprise a material that is capable of substantially minimizing shrinkage of the barrier layer 26, gel precursor 28 and/or the polymerized gel 29 during and after processing; that can provide support for the polymerized gel 29; and that is capable of facilitating handling of the polymerized gel 29 and the barrier layer 26. The stabilizing layer 30 can comprise any material that is substantially inelastic in comparison to the polymerized gel 29, in order to be capable of providing dimensional stability to the sheet 32 and/or to the molded products 19 during and after processing. Some possible materials for the stabilizing layer 30 include, but are not limited to, fabrics, paper, plastic (e.g., polyester, polyethylene, polyvinyl chloride (PVC), and the like) metal, metallized plastic, and/or the like, and combinations comprising at least one of the foregoing materials. One possible material is oriented polyester film, which is commercially available from a variety of sources and a under variety of different product names (e.g., Mylar®). Stabilization layer 30 can comprise a thickness ranging from about 0.2 mil to about 10 mil, more particularly from about 0.5 mil to about 5 mil, and more particularly still from about 1 mil to about 2 mil.

The foregoing methods and materials can facilitate the manufacture of polymeric articles and/or regions of articles, which can be desirable for aesthetics and/or to minimize wear and/or friction. The methods can be used to form polymeric articles and/or regions of articles, comprising any size, thickness or geometry. The size, thickness, geometry, softness, and adhesive strength of the articles and/or portions of the articles can be selected to optimize the conditions for which it is designed. Examples of articles in which the foregoing polymeric materials can be useful include, but are not limited to, handles for personal care objects such as hairbrushes, toothbrushes and razors; medical devices such as masks, crutches and casts; handles for household objects such as brooms; straps for luggage, backpacks, briefcases and purses; clothing such as cycling shorts, undergarments and shoes; utility objects such as mousepads, keyboard rests; handles and/or straps for consumer goods such as bottles and/or boxes, laundry detergent handles; sporting goods equipment and accessories such as racquet grips, bat handles, fishing rod grips, guns, and bicycle handlebar grips; and the like. In addition, the articles can comprise indicia such as labels with color, text and/or graphics, and the like.

Figure 12:
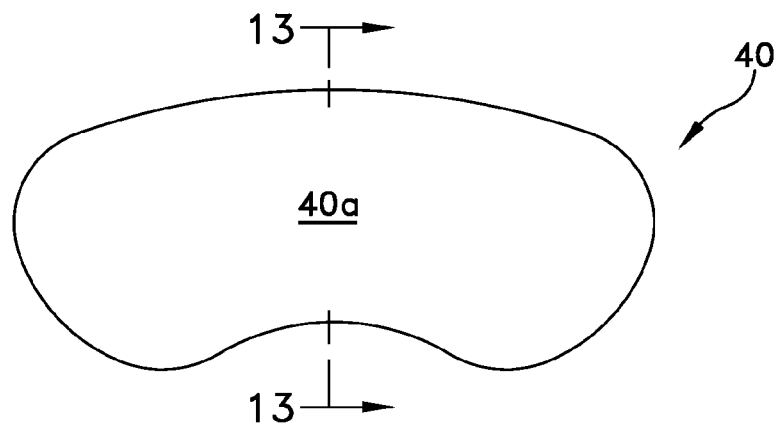
FIG. 12 is a top view of an exemplary shoe heel liner.
Figure 13:
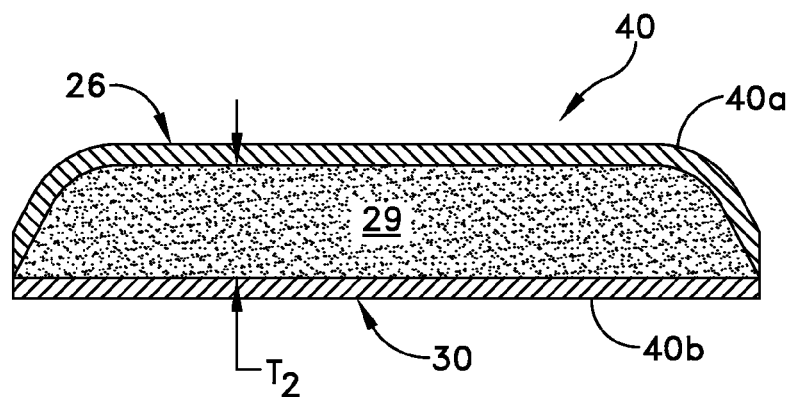
FIG. 13 is a cross-sectional view of the heel liner of FIG. 12, through lines 13-13.
Figure 14:
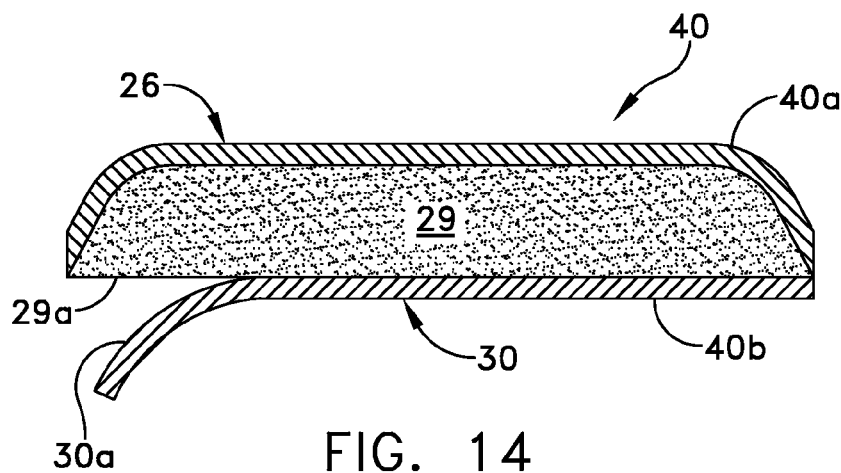
FIG. 14 is a cross-sectional view of the heel liner of FIG. 12, through lines 13-13, showing release of the stabilizing layer from the insert.

FIGS. 12-14 show an illustrative shoe heel liner 40 which can be formed using the foregoing methods and materials. Heel liner 40 can comprise opposing upper and lower surfaces 40a,40b. In the present illustrative embodiment, heel liner 40 can comprise a thickness of about ⅛ inch. A barrier layer 30 can be disposed adjacent to a polymerized gel layer 29, and a stabilizing layer 30 can be disposed on a side of the gel layer 29 opposite the barrier layer 26. If desired, the heel liner 40 can comprise an antifungal agent disposed in the barrier layer 26. In one illustrative embodiment, the barrier layer 26 can comprise an active agent such as silver, to prevent and/or treat the condition of athlete's foot. One possible barrier layer 26 comprising such an active agent is Vacuflex 18411, available from Omniflex, Inc.

In one embodiment, the polymerized gel layer 29 can comprise an adhesive strength sufficient to allow it to adhere to a surface, such as the inner surface of a shoe. Thus, the stabilizing layer 30 can optionally comprise a release coating (not illustrated) such as silicone, disposed on surface 30a, which can assist in the manual release of the stabilizing layer 30 from the polymerized gel 29, thereby exposing the polymerized gel 29 in order to allow it to be adhered to a surface.

In another embodiment, an adhesive (not illustrated), such as a pressure sensitive adhesive, can be disposed on surface 40b of the stabilizing layer 30 to allow heel liner 40 to be adhered to a surface, such as the inner surface of a shoe. Such an option may be useful, for example, if the stabilizing layer 30 does not comprise a release coating on surface 30a.

FIGS. 15-18 show another illustrative article, which is a substantially rigid toothbrush handle 41 comprising an insert 42 (hereinafter "handle insert") which can be formed using the foregoing methods and materials. Handle insert 42 comprises an upper surface 42a opposite a lower surface 42b. The handle insert 42 can comprise a thickness that varies from about ⅛ inch to ⅜ inch. In the present illustrative embodiment, handle insert 42 can comprise a barrier layer 26 disposed adjacent to a polymerized gel layer 29, a fabric layer 34 disposed on a side of the polymerized gel layer 29 opposite the barrier layer 26, and a stabilization layer 30 disposed adjacent the fabric layer opposite the gel layer 29. In the present illustrative embodiment, an adhesive can be disposed between the fabric layer 34 and the stabilization layer 30. If desired, the handle insert 42 can comprise an antifungal agent disposed in the barrier layer 26, as in the previous embodiment. Handle insert 42 can be disposed in the substantially rigid toothbrush handle 41 by peeling back and removing the stabilization layer 30, exposing the adhesive on the fabric layer, and adhering the adhesive surface to the rigid handle 41 (which can be recessed).

Figure 19:
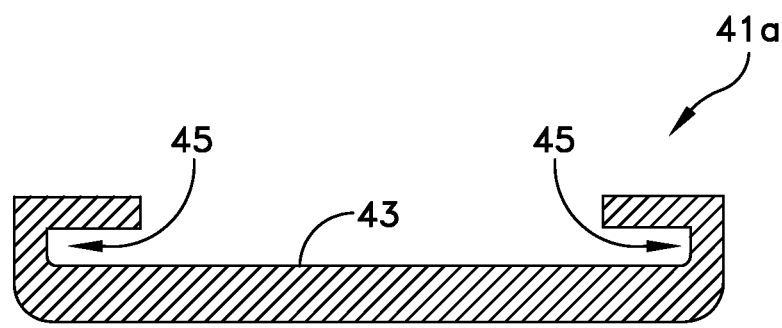
FIG. 19 is a cross-sectional view of another exemplary rigid toothbrush handle with a channel for receiving a gel insert.
Figure 20:
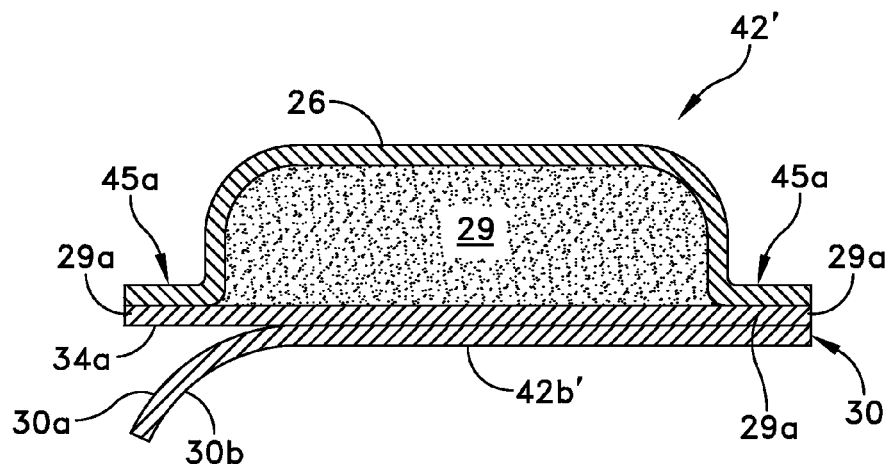
FIG. 20 is a cross-sectional view of a handle insert adapted to be disposed in the handle of FIG. 19.
Figure 21:
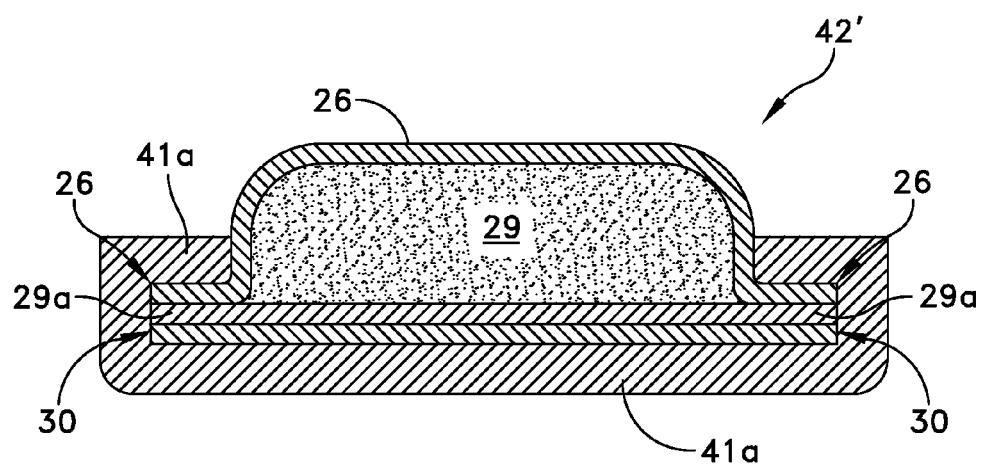
FIG. 21 is a cross-sectional view of the toothbrush handle of FIG. 19, showing the gel insert of FIG. 20 disposed in the handle.

FIGS. 19-21, when taken together, show another exemplary handle 41'. As shown, handle 41' comprises a rigid handle portion 41a and a handle insert 42'. Handle insert 42' can comprise the same materials as in the previous embodiment. In the present embodiment, handle 41' defines a recess 43 and a channel 45, both of which are configured to receive handle insert 42'. Handle insert 42' comprises a flange 45 formed from the barrier, fabric and stabilization layers, extending outwardly from the body portion. Disposing the handle insert 42' into the rigid handle portion 41a can comprise disposing flange 45a into the channel 45 and the body portion in the recess 43. If it is desired to further secure handle insert 42' into the rigid handle portion 41a, then the stabilization layer 30 can be released (i.e., peeled) from the fabric layer 34, and handle insert 42 can be adhered in the recess and channel by the adhesive, as shown in FIG. 21.

Other articles can be formed to include a flange as in the previous embodiment, and such articles can be secured in or on another article by, for example, stitching, glue, rivets, and the like. For example, the flange can be sewn into a garment, such that the stitches go through the flange and the garment. Examples of such articles include, but are not limited to, elbow pads, knee pads, etc. Examples of non-clothing articles include, but are not limited to, shoulder straps for purses, computer bags, luggage, and the like.

Figure 22:
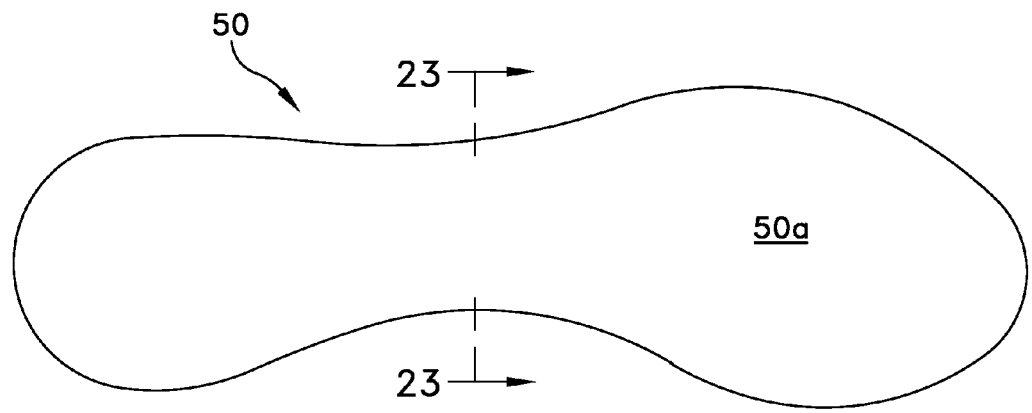
FIG. 22 is a top view of an exemplary shoe insert.
Figure 23:
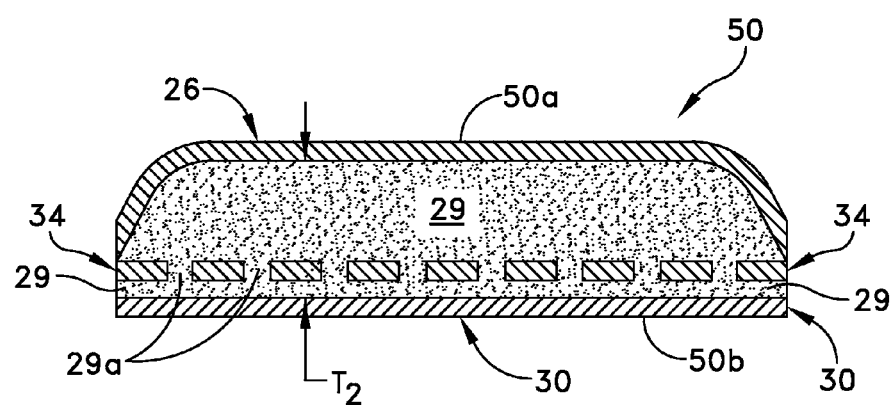
FIG. 23 is a cross-sectional view of the shoe insert of FIG. 21 through lines 23-23, showing the resulting gel flow through the porous fabric layer.
Figure 24:
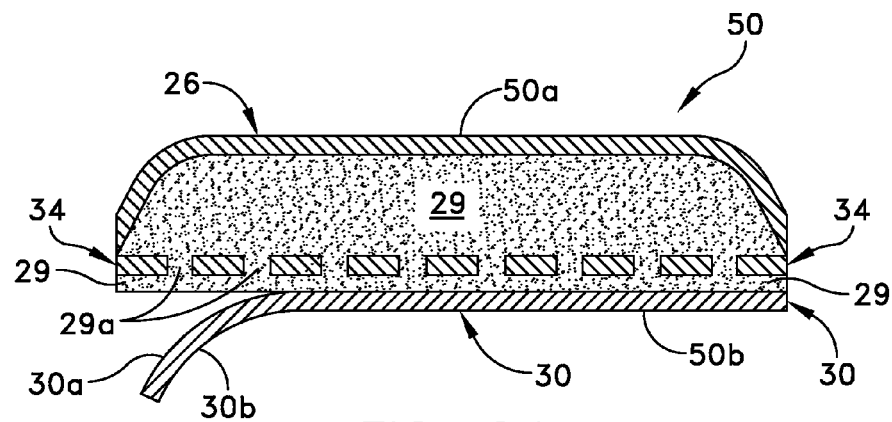
FIG. 24 is a cross-sectional view of the shoe insert of FIG. 23, and showing release of the stabilizing layer from the gel.

FIGS. 21-23 show an exemplary open toe shoe liner 50 which can be formed using the foregoing methods and materials. In the present illustrative embodiment, shoe insert 50 can comprise a barrier layer 26 disposed adjacent to a first polymerized gel layer 29, a fabric layer 34 disposed on a side of the polymerized gel layer 29 opposite the barrier layer 26, a second polymerized gel layer 29a disposed on a side of the fabric layer opposite the first polymerized gel layer 29, a plurality of polymerized gel portions 29b disposed in the fabric layer 34 and interconnecting gel layers 29 and 29a, and an optional stabilization layer 30 disposed adjacent the second gel layer 29a opposite gel layer 29.

As noted above, layer 34 can be at least partially fluid-permeable, which can allow penetration of the gel precursor through at least a portion of layer 34 (e.g., through the strands of a woven textile). Thus, during the molding process, when the gel precursor flows through layer 34 or a portion of layer 34, a tacky, adhesive surface can be formed on the side of layer 34 opposite the polymerized gel layer 29, which surface can be a continuous or discontinuous layer, depending on the amount of gel precursor that flows through layer 34. Thus, in the final product, layer 34 can be sandwiched between two gel layers 29, 29a that are interconnected with gel portions 29c that extend through layer 34 (see FIGS. 21-23). It should be understood that the drawings are not to scale, and that the degree of penetration into and/or through layer 34 depends on a variety of factors including, but not limited to, the type of material, the thickness of material, the degree to which the material is fluid-permeable (e.g., the size of any pores and/or openings in layer 34, and the like), the viscosity of the gel, the molding pressure and temperature, and the like. Thus, the thickness of gel layer 29a, and whether the layer is continuous or discontinuous depends on the foregoing as well.

As noted above, the adhesive strength of gel layer 29,29a can vary, depending on a variety of factors. In one embodiment, if the gel layer 29a has sufficient adhesive strength, it can be used to adhere the shoe insert 50 directly to a surface, such as the inner surface of a shoe (not illustrated), thereby eliminating a separate adhesive. In another embodiment, an adhesive (not illustrated) can be disposed between the gel layer 29a and the stabilization layer 30, if desired. Shoe insert 50 can be disposed in the shoe (not illustrated) by peeling back and removing the stabilization layer 30, exposing the adhesive gel layer 29a, and adhering the gel layer 29a to the shoe insert 50. If desired, shoe insert 50 can comprise an antifungal agent disposed in the barrier layer 26, as in the previous embodiment.

In either of the foregoing embodiments, the use of a colored or patterned layer 34 (e.g., a colored and/or patterned fabric layer) in combination with a transparent gel can provide what appears to be a colored or patterned gel article. This can create an article with much more color variations than would be possible with simply using colored or pigmented gel. The use of patterned fabrics or metallic sheen fabrics or other variations in the aesthetic of layer 34 can impart these aesthetics to the gel article; such aesthetics would be difficult or impossible to impart to the gel article by pigmenting the gel or printing the gel article. This process also offers a potential economic advantage to coloring or printing the gel.

The following non-limiting examples further illustrate the various embodiments described herein.

WORKING EXAMPLES

Thickness And Hardness Measurements

In the Examples, the thickness of the products was determined using a drop gauge, and the hardness of the gel and/or molded products was determined using a durometer.

To measure the hardness of molded products (e.g., including the barrier, fabric and/or stabilization layers), the flat of the durometer (e.g., PTC Model 411 for 00 scale; Shore Inc. for 000 scale) was placed on the molded product, and a timer was started. Due to its viscoelastic nature, the gel was allowed to relax for sixty (60) seconds in order to reach equilibrium, and the durometer reading was recorded.

To compare the hardness of the molded products, samples of the gel from each examples were used to form samples having a thickness of about 11+/−1 mm (0.395-0.474"). First, the thickness of the bottom surface of a 100×15 Petri dish (Daigger scientific #EF7159A) was measured using a drop gauge with a ½ inch diameter tip. The gel was prepared and dispensed into the Petri dish to within about 1 mm (millimeter) of the upper rim, resulting in a gel layer of about 11+/−1 mm (0.395-0.474"), and the gel was allowed to cure. The upper surface of the gel was lightly powdered with talcum powder in order to minimize the tackiness of the gel. Again using the drop gauge, the combined thickness of the cured gel and the bottom surface of the Petri dish was determined, and the thickness the Petri dish was subtracted from the combined thickness. Thereafter, the durometer was used to measure the hardness of the gel (i.e., without the barrier, fabric and/or stabilization layers).

Example 1

Formation of a colorless, transparent self-adhesive heel liner for a shoe.

A Desma rotary table molding machine was used. A metal mold defining thirty six (36) heel liners was selected for use in the Desma machine. The mold comprised a recessed region of about 0.020", and a gasket spaced apart both from the perimeter of the mold edge and from the recessed region. The dimensions of each of the 36 mold units were about 4 inches by about ½ inch, and the depth of the mold units was uniform.

The mold was preheated to about 150° F., and a barrier layer was disposed as a sheet onto the upper surface of the mold, and fixed in place using, for example, pins that correspond to holes in the sheet. The barrier layer was Vacuflex 18411 (available from Omniflex, Inc.), which is a colorless, transparent polyurethane film having a thickness of about 0.75 mil, an elongation of about 400% to about 500%, and which was supported on a polyethylene support layer having a thickness of about 1.5 mil. The barrier layer was disposed onto the upper surface of the mold such that the polyethylene layer was facing the mold and the polyurethane film was facing away from the mold.

About 243 grams (gm) of a gel precursor was prepared and manually poured onto the barrier layer. The gel precursor was a thermosetting polyurethane gel system available as WE 369-1 from Isotec International, and prepared using about 0.02 percent by weight (wt. %) based on the weight of the gel precursor. No coloring was added to the gel precursor.

A sheet of stabilizing film was disposed over a portion of the gel precursor and fixed in place using, for example, pins that correspond to holes in the sheet. The stabilizing film was a sheet of Hostaphan 2000 2SLK (available from Mitsubishi), which is a polyester film with a silicone release agent on one surface. The film had a thickness of about 2 mil. The stabilizing film was disposed onto the gel precursor such that the surface of the film that was coated with the silicone release agent was in contact with the gel precursor. Manual pressure was applied to the stabilizing film behind the interface between the gel precursor and the stabilizing film and the stabilizing film was advanced over the gel precursor until the entire surface of the gel precursor was covered with the stabilizing film.

The mold was closed and pressurized to about 25 pounds per square inch (psi). After approximately four (4) minutes, the mold was opened and a colorless, transparent sheet containing thirty six (36) molded heel liners was manually removed from the mold. The sheet was capable of being manually removed from the mold without adhering to the surface of the mold or to the hands of the operator.

The polyethylene support/carrier layer for the barrier layer was removed, and then the sheet was die cut around the perimeter of each of the thirty six (36) heel liners. The sheet was capable of being die cut without adhering to the die cutter as a result of the stability provided by the polyester layer and the barrier layer. The molded heel liners were then removed from the sheet.

The dimensions of each of the molded, die cut heel liners was about four (4) inch by 1.3 inch; the thickness was about 0.102 inch, and the durometer was about 38 Shore 00 (both measured with the barrier layer and stabilization layer).

For comparison, a sample of same gel used in the instant example was prepared in a Petri dish, as discussed above. The durometer of the gel (without the barrier layer and stabilization layer) was about 22 Shore 00.

The molded shoe inserts were flexible, pliable, colorless and transparent, and exhibited minimal shrinkage in comparison to the dimensions of the individual heel liner molds.

To apply the heel liner to the interior of a shoe, the polyester layer was manually removed from the heel liner, thereby exposing the underlying polyurethane gel. The polyurethane gel was disposed against the interior of the shoe. The polyurethane gel was extremely tacky, such that it adhered to the interior surface of a shoe heel in the absence of a separate or added adhesive. The heel liner did not adhere to the user's foot due to the presence of the barrier layer, which provided a smooth surface against the user's heel. The polyurethane gel was very soft and pliable, and the polyurethane barrier layer flexed with the movement of the gel. Because the heel liner was colorless and transparent, it was not visible to a casual observer.

Example 2

Formation of a colorless, transparent self-adhesive sling strap for a ladies sling-back type shoe.

A metal mold comprising one hundred forty (140) mold units, each defining a sling strap insert, was selected for use. The mold comprised a recessed region of about 0.020", and a gasket spaced apart both from the perimeter of the mold edge and from the recessed region. The dimensions of each of the one hundred forty (140) mold units were about 3.0 inch by about 0.3125 inch. The same materials and process that were used in Example 1 were used in the present example.

The dimensions of each of the molded, die cut sling strap inserts was about 3.01 inch by about 0.3225 inch. Thus, the molded sling strap inserts exhibited minimal shrinkage in comparison to the dimensions of the individual sling strap insert molds. The molded sling strap inserts were flexible, pliable, colorless and transparent. The polyester layer was manually removed from the sling strap insert, exposing the underlying polyurethane gel, which was extremely tacky, allowing it to be adhered to the interior surface of a sling-back type strap of a women's' shoe, in the absence of a separate or added adhesive. The heel liner did not adhere to the user's foot due to the presence of the barrier layer, which provided a smooth surface against the user's heel. The polyurethane gel was very soft and pliable, and the barrier layer flexed with the movement of the gel. Because the heel liner was transparent, it was not visible to a casual observer.

Formation of a colorless, transparent self-adhesive sling strap insert for a ladies sling-back type shoe.

A metal mold comprising one hundred forty (140) mold units, each defining a sling strap insert, was selected for use. The mold comprised a recessed region of about 0.020", and a gasket spaced apart both from the perimeter of the mold edge and from the recessed region. The dimensions of each of the one hundred forty (140) mold units were about 3.0 inch by about 0.3125 inch. The same materials and process that were used in Example 1 were used in the present example.

The dimensions of each of the molded, die cut sling strap inserts was about 3.01 inch by about 0.3225 inch. Thus, the molded sling strap inserts exhibited minimal shrinkage in comparison to the dimensions of the individual sling strap insert molds. The sling straps were too small to obtain thickness and hardness measurements.

The molded sling strap inserts were flexible, pliable, colorless and transparent. The polyester layer was manually removed from the sling strap insert, exposing the underlying polyurethane gel, which was extremely tacky, allowing it to be adhered to the interior surface of a sling-back type strap of a women's' shoe, in the absence of a separate or added adhesive. The heel liner did not adhere to the user's foot due to the presence of the barrier layer, which provided a smooth surface against the user's heel. The polyurethane gel was very soft and pliable, and the barrier layer flexed with the movement of the gel. Because the heel liner was transparent, it was not visible to a casual observer Example 3

Formation of a colored, self-adhesive, insert for a rigid toothbrush handle.

A metal mold defining fifty (50) toothbrush handle inserts was selected for use. The mold comprised a recessed region of about 0.020", and a gasket spaced apart both from the perimeter of the mold edge and from the recessed region. The dimensions of each of the 50 mold units had a length of about 4 inch and a width that varied from about ⅛ inch to about ⅜ inch. The depth of the mold units varied from about ⅛ inch to about ⅜ inch. The same materials and process that were used in Example 1 were used in the present example, with the addition of about 0.4 wt. % of a chemical dye to the gel precursor (Blue TR Repliplast 67798 available from Pat Products).

The dimensions of each of the molded, die cut toothbrush handles was about 4.25 inch by about 0.625 inch; and the durometer was about 45-55 Shore 00 (measured with the barrier layer and stabilization layer).

The resulting individual molded toothbrush handle inserts were blue, transparent, flexible and pliable, and exhibited minimal shrinkage in comparison to the dimensions of the individual toothbrush handle mold units.

The Hostaphan polyester film was manually removed from the toothbrush handle insert, thereby exposing the underlying blue polyurethane gel. The polyurethane gel was extremely tacky, allowing it to be adhered to a recessed region of a rigid toothbrush handle, in the absence of a separate or added adhesive. The blue color of the handle insert provided an aesthetic appeal to the user.

Portions of the handle insert were thicker than the depth of the recessed region in the rigid portion of the toothbrush handle. Therefore, portions of the handle insert were raised relative to the surface of the rigid handle. The polyurethane gel was very soft and pliable, and the barrier layer flexed with the movement of the gel. The surface of the polyurethane barrier film provided a smooth surface against the user's hand. The antifungal/antibacterial agent in the polyurethane barrier film provided protection against the formation of bacteria/fungus in the high humidity of a bathroom environment.

Example 4

Formation of a colored, patterned self-adhesive, insert for a rigid toothbrush handle.

The same mold and materials that were used in Example 3 were used in the present example. After disposing the gel precursor onto the barrier layer, a fabric layer was disposed as a sheet over a portion of the gel precursor. The fabric had various colors and patterns. Pressure was applied manually to the fabric layer behind the interface of the gel precursor and the fabric layer while advancing the fabric layer over the remaining exposed gel precursor, until the fabric layer covered the entire surface of the gel precursor.

A pressure sensitive adhesive was disposed onto the fabric layer. The pressure sensitive adhesive was product number 950 from 3M.

A sheet of the Hostaphan 2000 2SLK stabilizing film was disposed over the pressure sensitive adhesive, such that the silicone release agent was in contact with the pressure sensitive adhesive.

The mold was closed and pressurized to about 25 pounds per square inch (psi). After approximately four (4) minutes, the mold was opened and a patterned sheet containing the molded toothbrush handle inserts was manually removed from the mold and die cut as in previous examples.

The toothbrush handle inserts were flexible and pliable, and exhibited minimal shrinkage in comparison to the dimensions of the individual toothbrush handle mold units.

The Hostaphan polyester film was manually removed from the toothbrush handle insert, thereby exposing the underlying pressure sensitive adhesive that was disposed on the fabric layer, and the handle insert was thereby adhered to a recessed region of a rigid toothbrush handle. The pattern of the fabric was visible through the Isotec Gel and the Vacuflex film, providing an aesthetic appeal to the user.

Example 5

Formation of a colored, self-adhesive, open toe sole liner with peel-away Mylar liner.

A metal mold defining six (6) pair of open toe sole liners was selected for use. The mold comprised a recessed region of about 0.020", and a gasket spaced apart both from the perimeter of the mold edge and from the recessed region. The dimensions of each of the mold units had a length of about 8⅛ inch and a width of about 2⅞ inch (at the widest). The depth of the mold units varied from about ⅛ inch to about ⅜ inch. The same materials and process that were used in Example 1 were used in the present example, with the addition of a fabric layer. That is, after disposing the gel precursor onto the barrier layer, a layer of red lame fabric was disposed as a sheet over a portion of the gel precursor. Pressure was applied manually to the fabric layer behind the interface of the gel precursor and the fabric layer while advancing the fabric layer over the remaining exposed gel precursor, until the fabric layer covered the entire surface of the gel precursor.

A sheet of the Hostaphan 2000 2SLK stabilizing film was disposed over the fabric layer, such that the silicone release agent was in contact with the fabric layer.

The mold was closed and pressurized to about 25 pounds per square inch (psi). After approximately four (4) minutes, the mold was opened and a patterned sheet containing the molded open toe sole liners was manually removed from the mold and die cut as in previous examples.

The open toe sole liners were flexible and pliable, and exhibited minimal shrinkage in comparison to the dimensions of the individual open toe sole liner mold units. The molded shoe liners had a length of about 8⅛ inch and a width of about 2⅞ inch. The thickness at the heel pad was about 0.155 inch and the durometer was about 38 Shore 00 (both measured with the barrier layer and stabilization layer). The thickness at the ball of foot pad was about 0.102 inch and the durometer was about 43 Shore 00 (both measured with the barrier layer and stabilization layer).

For comparison, a sample of same gel used in the instant example was prepared in a Petri dish, as discussed above. The durometer of the gel (without the barrier layer and stabilization layer) was about 25 Shore 00 at the heel pad, and about 33 at the ball of foot pad.

The Hostaphan polyester film was manually removed from the open toe sole liner, exposing a substantially uniform and continuous layer of gel, instead of the fabric layer. Thus, during the molding process, the gel precursor flowed through the fabric to from another layer of gel between the fabric and the polyester film. Because the gel and Vacuflex film were transparent, the metallic red color of the lame fabric was visible to a user, providing an aesthetic appeal. In addition, after peeling the polyester film layer from the open toe sole liner, the exposed gel layer that was formed between the fabric and the polyester film was sufficiently sticky to allow the open toe sole liner to be adhered to the inner surface of a shoe.

The method(s) of the present disclosure can comprise one or more of the following advantages: 1) the use of the relatively thin barrier layer and the release layer on opposite sides of the polymerized gel layer allows relatively low durometer polymeric materials to be handled in molding equipment and by the equipment operators, without adhering to the equipment and/or operators; 2) the use of the relatively thin barrier layers allows the use of reduced total amounts of additives, which reduces costs; 3) the use of the relatively thin barrier layer allows relatively low durometer polymeric materials to be molded into a variety of shapes, sizes, densities, and to form articles in which the cross-sectional area varies in size, shape and density; 4) the use of the stabilizing layer reduces and/or eliminates shrinkage of the gel precursor, gel and/or barrier layer during and after processing; 5) when using a polyurethane gel, the process is capable of providing colorless and transparent articles that do not yellow, as is typical of polyurethanes after exposure to ultra-violet energy.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A molded article, comprising:
a thermoplastic elastomeric (TPE) barrier layer;
a fluid-permeable layer; and a first polymerized gel layer disposed between and enclosed by the barrier layer and the fluid-permeable layer, wherein at least a portion of the first polymerized gel layer extends at least partially through the fluid-permeable layer.

2. The molded article of claim 1, further comprising a second layer of polymerized gel, wherein the first and second polymerized gel layers are at least partially interconnected through the fluid-permeable layer.

3. The molded article of claim 1, wherein the fluid-permeable layer is selected from the group consisting of synthetic and non-synthetic paper, knit fabrics, woven fabrics, non-woven fabrics, films, composites and/or combinations comprising at least one of the foregoing.

4. The molded article of claim 1, wherein the fluid-permeable layer comprises color, text, graphics, and combinations thereof.

5. The molded article of claim 1, wherein the barrier layer is a TPE film.

6. The molded article of claim 1, wherein the barrier layer comprises a support layer, and the TPE is disposed on the support layer, adjacent to the polymerized gel.

7. The molded article of claim 1, wherein the TPE film has an elongation ranging from about 100 percent to about 1500 percent.

8. The molded article of claim 1, wherein the TPE film has an elongation ranging from about 200 percent to about 1000 percent.

9. The molded article of claim 1, wherein the TPE film has an elongation ranging from about 300 percent to about 700 percent.

10. The molded article of claim 1, wherein the TPE film has a thickness ranging from about 0.2 milli-inch to about 5 milli-inch.

11. The molded article of claim 1, wherein the TPE film has a thickness ranging from about 0.5 milli-inch to about 3 milli-inch.

12. The molded article of claim 1, wherein the TPE film has a thickness ranging from about 0.6 milli-inch to about 2 milli-inch.

13. The molded article of claim 1, wherein the TPE is selected from the group consisting of thermoplastic polyurethane (TPU), silicone, and combinations comprising at least one of the foregoing.

14. The molded article of claim 1, wherein the barrier layer comprises an active agent.

15. The molded article of claim 14, wherein the active agent is selected from the group consisting of silver, tolnaftate, undecenoic acid, allylamines, chlorine, copper, baking soda, sodium omadine, zinc omadine, azoles, and combinations comprising at least one of the foregoing.

16. The molded article of claim 1, further comprising a manually releasable stabilizing layer disposed adjacent to the fluid-permeable layer, opposite the polymerized gel layer.

17. The molded article of claim 1, wherein the stabilizing layer comprises a thickness ranging from about 0.2 milli-inch to about 10 milli-inch.

18. The molded article of claim 1, wherein the stabilizing layer comprises a thickness ranging from about 0.5 milli-inch to about 5 milli-inch.

19. The molded article of claim 1, wherein the stabilizing layer comprises a thickness ranging from about 1 milli-inch to about 2 milli-inch.

20. The molded article of claim 1, wherein the first and second polymerized gel layers each comprise a hardness ranging from about 30 Shore 000 to about 88 Shore D.

21. The molded article of claim 1, wherein the first and second polymerized gel layers each comprise a hardness ranging from about 0.01 Shore 00 to about 70 Shore 00.

22. The molded article of claim 1, wherein the first and second polymerized gel layers each comprise a hardness ranging from about 30 Shore 000 to about 85 Shore 00.

23. The molded article of claim 1, wherein the polymerized gel layer comprises an adhesive strength sufficient to adhere to a surface.

24. The molded article of claim 1, wherein the polymerized gel layer comprises a polyurethane.

25. The molded article of claim 1, wherein the polymerized gel is transparent and the fluid-permeable layer comprises color, text, graphics, and combinations thereof.

26. The molded article of claim 1, wherein the polymerized layer and the stabilizing layer each comprise an adhesive strength, and the adhesive strength of the stabilizing layer is less than the adhesive strength of the polymerized layer.

27. The molded article of claim 26, comprising an adhesive material disposed on the stabilization layer and/or the fluid-permeable layer, between the stabilization and fluid-permeable layers.

28. The molded article of claim 1, further comprising a release agent disposed on one or both of the second polymerized gel layer and the stabilizing layer, between the second polymerized gel layer and the stabilizing layer.

29. The molded article of claim 1, wherein the barrier layer and/or the stabilizing layer comprise opposing surfaces, and a release agent is disposed on one or both of the opposing surfaces.

30. The molded article of claim 13, further comprising a release agent disposed on a surface of the barrier and/or stabilizing layers adjacent to the gel precursor.

31. The molded article of claim 2, further comprising a release agent disposed between the second polymerized gel layer and the stabilizing layer.

32. The molded article of claim 1, further comprising a flange extending from at least a portion of the perimeter of the molded article.

33. The molded article of claim 30, attached to a garment at the flange.

34. The molded article of claim 1, wherein the article is a self-adhesive article.

35. A molded article, comprising:
a thermoplastic polyurethane barrier layer comprising an active agent selected from the group consisting of silver, tolnaftate, undecenoic acid, allylamines, chlorine, copper, baking soda, sodium omadine, zinc omadine, azoles, and combinations comprising at least one of the foregoing;
a fluid-permeable layer; and
a first polymerized gel layer disposed between and enclosed by the barrier layer and the fluid-permeable layer, wherein at least a portion of the first polymerized gel layer extends at least partially through the fluid-permeable layer;
a second layer of polymerized gel, wherein the first and second polymerized gel layers are at least partially interconnected through the fluid-permeable layer;
wherein the first and second polymerized gel layers each comprise a hardness ranging from about 0.01 Shore 00 to about 70 Shore 00.

36. A molded article, comprising:
a thermoplastic elastomeric (TPE) barrier layer;
a fluid-permeable layer; and
a first polymerized gel layer disposed between and enclosed by the barrier layer and the fluid-permeable layer, wherein at least a portion of the first polymerized gel layer extends at least partially through the fluid-permeable layer.

37. The molded article of claim 36, comprising a perimeter, and further comprising a flange extending from at least a portion of the perimeter.

* * * * *